US012749137B2

(12) United States Patent
Bicknell, Jr. et al.

(10) Patent No.: US 12,749,137 B2
(45) Date of Patent: *Sep. 29, 2026

(54) SYSTEM AND METHOD FOR DETERMINING AND VISUALIZING SYSTEM COMPLEXITY

(71) Applicant: More Cowbell Unlimited, Inc., Lake Oswego, OR (US)

(72) Inventors: John Williams Bicknell, Jr., Lake Oswego, OR (US); Josh Logan Sullivan, Alabaster, AL (US); Martin Benjamin Jetton, Portland, OR (US)

(73) Assignee: More Cowbell Unlimited, Inc., Lake Oswego, OR (US)

( * ) Notice: Subject to any disclaimer, the term of this patent is extended or adjusted under 35 U.S.C. 154(b) by 143 days.

This patent is subject to a terminal disclaimer.

(21) Appl. No.: 18/830,913

(22) Filed: Sep. 11, 2024

(65) Prior Publication Data

US 2025/0095243 A1 Mar. 20, 2025

Related U.S. Application Data

(60) Provisional application No. 63/582,979, filed on Sep. 15, 2023.

(51) Int. Cl.
*G06Q 50/26* (2024.01)
*G06T 11/26* (2026.01)

(52) U.S. Cl.
CPC ............ *G06Q 50/265* (2013.01); *G06T 11/26* (2026.01)

(58) Field of Classification Search
CPC ...... G06F 16/2477; G06F 16/26; G06F 11/32; G06F 11/3438
See application file for complete search history.

(56) References Cited

U.S. PATENT DOCUMENTS

| | | | | |
|---|---|---|---|---|
| 6,123,259 | A | 9/2000 | Ogasawara | |
| 2009/0099820 | A1 | 4/2009 | Kaplan | |
| 2017/0053008 | A1* | 2/2017 | Frenkel | G06F 16/26 |
| 2018/0048658 | A1 | 2/2018 | Hittel et al. | |
| 2022/0346855 | A1 | 11/2022 | Xu et al. | |
| 2023/0048137 | A1* | 2/2023 | Jain | G06F 11/3428 |
| 2023/0306127 | A1* | 9/2023 | Shua | G06F 21/6218 |
| 2024/0143597 | A1* | 5/2024 | Singh | G06Q 10/10 |
| 2024/0289347 | A1* | 8/2024 | Panwar | G06F 16/24568 |
| 2025/0095095 | A1 | 3/2025 | Bicknell, Jr. | |

OTHER PUBLICATIONS

Office Action for U.S. Appl. No. 18/830,941, dated Mar. 9, 2026, 19 Pages.
Office Action for U.S. Appl. No. 18/830,941, dated Sep. 26, 2025, 20 pages.

* cited by examiner

*Primary Examiner* — Van N Chow
(74) *Attorney, Agent, or Firm* — Lee & Hayes, P.C.

(57) ABSTRACT

A platform configured to determine entropy data associated with a process or system and to generate one or more visual representation of the entropy data. In some cases, the platform may cause the visual representation to be displayed to a user and to generate alerts when deviations in entropy are detected with respect to a threshold.

20 Claims, 23 Drawing Sheets

1100

1600

1700

1706

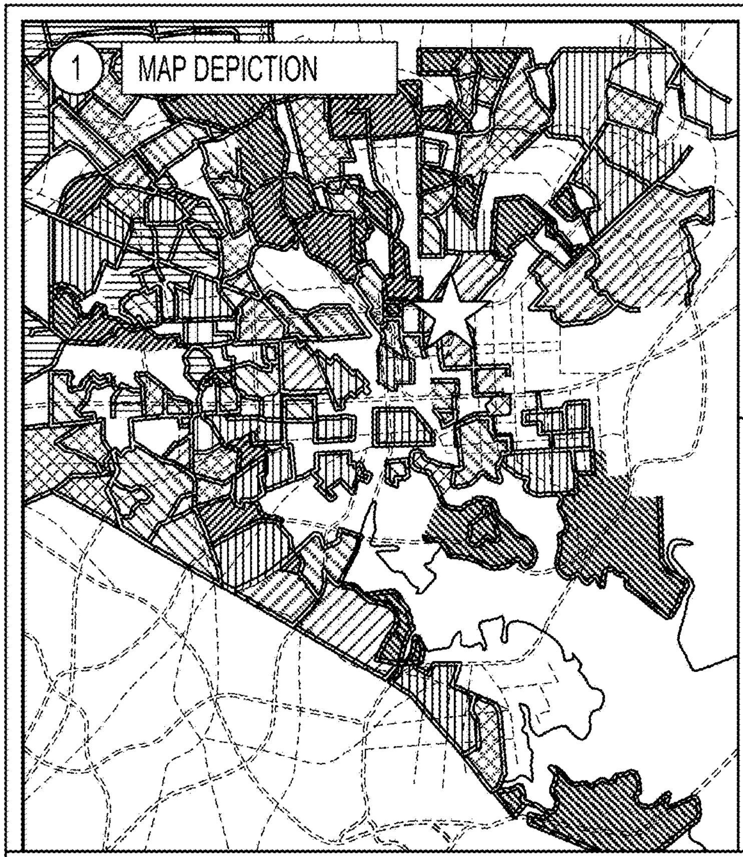

CONTINUED ON FIG. 17B

CONTINUED ON FIG. 17C

1708

COMPARED TO JANUARY OF 2020, THE MONTHLY VARIETY OF LIFE THREATENING CRIME IN THE NEIGHBORHOOD OF [NEIGHBORHOOD NAME] HAS INCREASED SIGNIFICANTLY.
IN 2020, SHOOTINGS, HOMICIDES, AND RAPES ACCOUNTED FOR 0% OF ALL CRIMES.
IN 2022, SHOOTINGS, HOMICIDES, AND RAPES ACCOUNTED FOR 7% OF ALL CRIMES.
[NEIGHBORHOOD NAME] RANKS 160 OUT OF279 NEIGHBORHOODS IN [CITY] WITH RESPECT TO LIFE THREATENING CRIME.

FIG. 17A

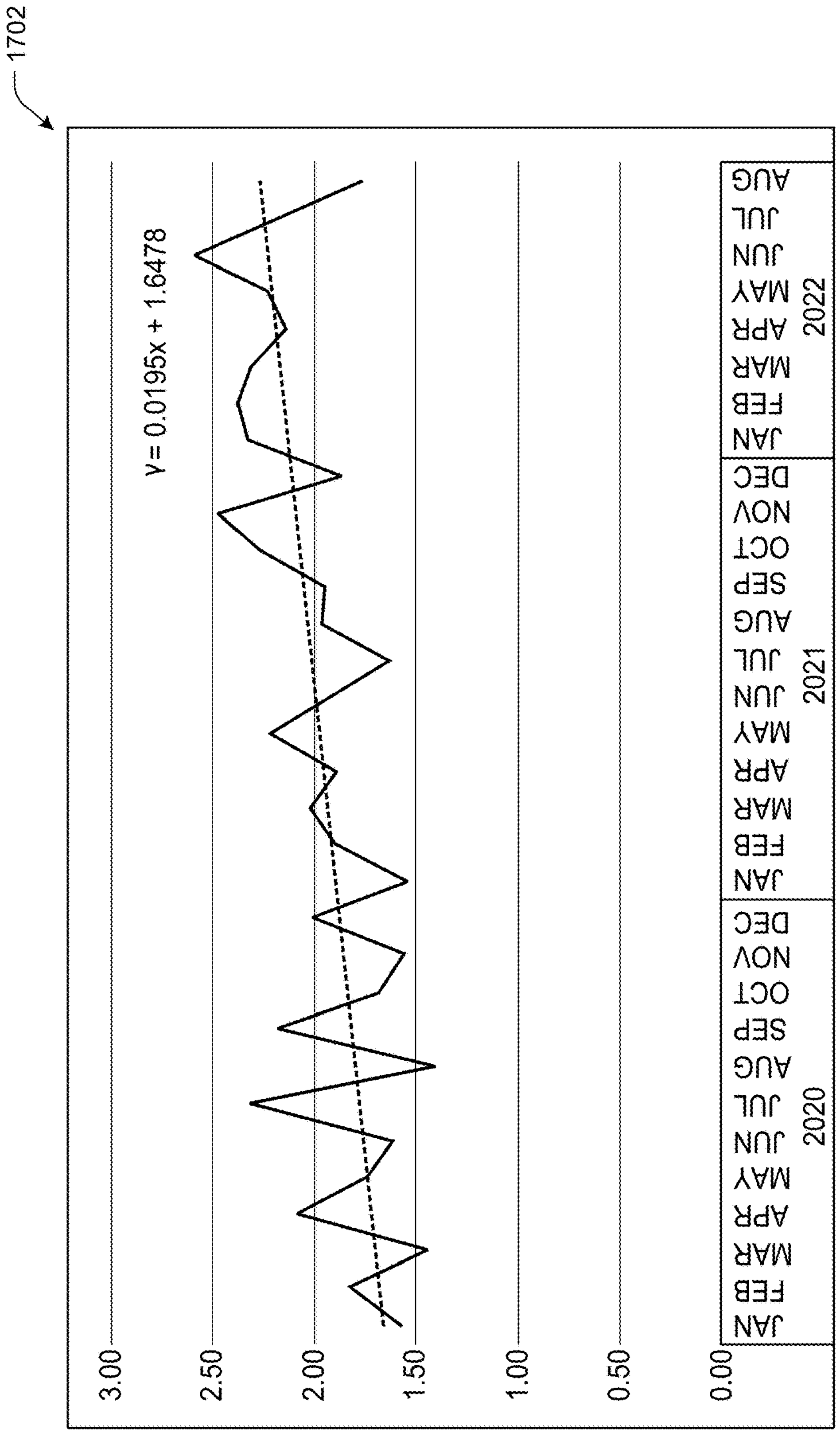
FIG. 17B
CONTINUED FROM FIG. 17A

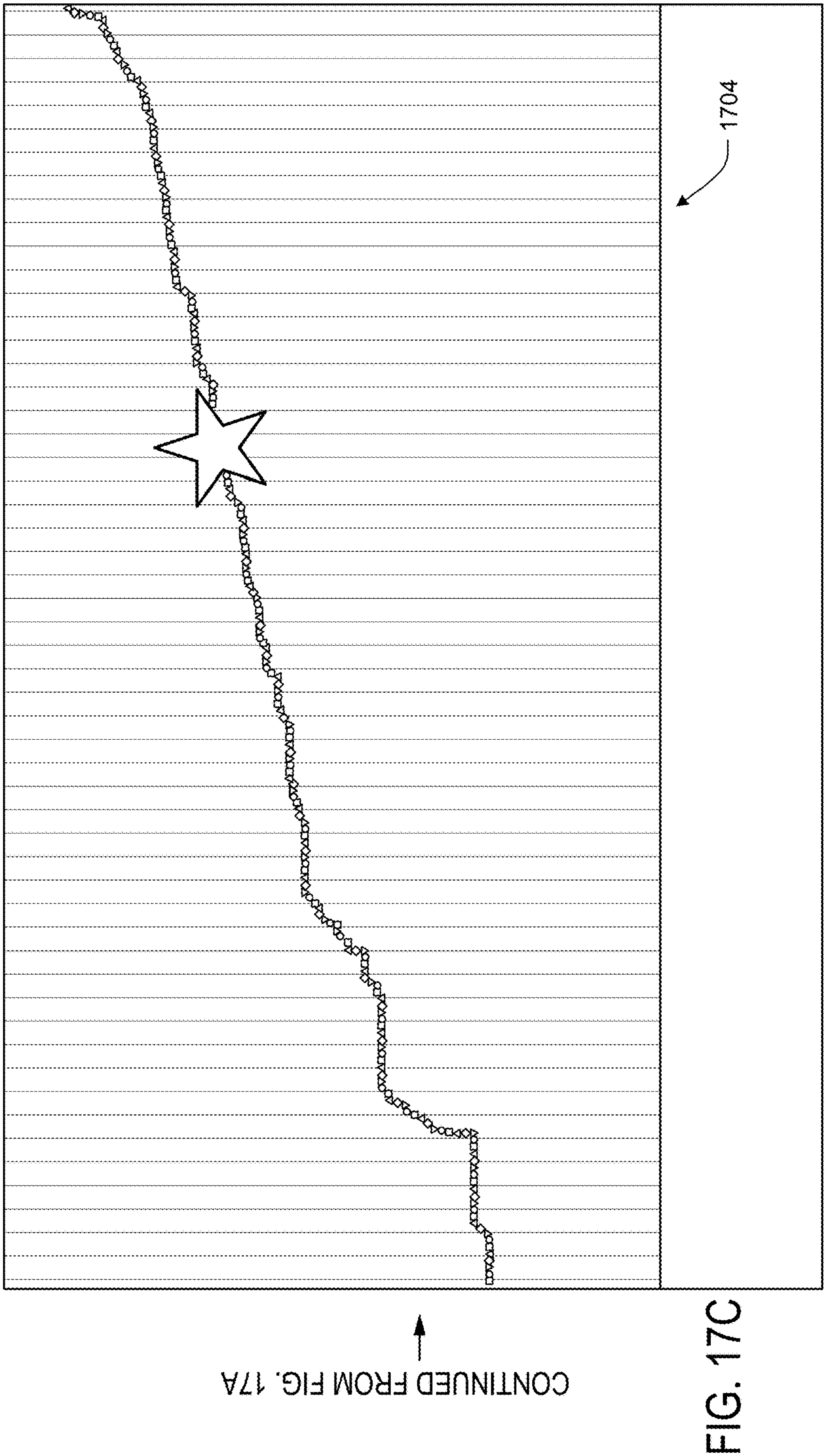
CONTINUED FROM FIG. 17A
FIG. 17C

1800

SYSTEM AND METHOD FOR DETERMINING AND VISUALIZING SYSTEM COMPLEXITY

CROSS-REFERENCE TO RELATED APPLICATION

This application claims priority to U.S. Provisional Application No. 63/582,979, filed on Sep. 15, 2023 and entitled "System and Method for Determining and Visualizing System Complexity," the entirety of which is incorporated herein by reference.

BACKGROUND

A system or process may be considered a collection of related activities or events representing an initialization through completion of each individual activity. Conventionally, such systems or processes are visualized as a flowchart or other static diagram of organization and predictability of the activities. However, conventional visualizations that are directed to the results or predictability of the activities fails to provide a key understanding of entropy associated with each activity or event or a collection of activities or events, which can be useful to improve processes, systems, decision making, or for understanding complex relationships between agents, activities, and/or events. These complex relations include but are not limited to cognitive state estimates of humans and animals engaged with systems, planning and execution cycles, energy expenditure, and evolving complexity.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 17A illustrates a partial pictorial diagram of a time series visual representation and geospatial visual representation of entropy data according to some implementations.

FIG. 17B illustrates a partial pictorial diagram of a time series visual representation of entropy data of FIG. 17A according to some implementations.

FIG. 17C illustrates a partial pictorial diagram of a time series visual representation of entropy data of FIG. 17A according to some implementations.

DETAILED DESCRIPTION

Figure 1:
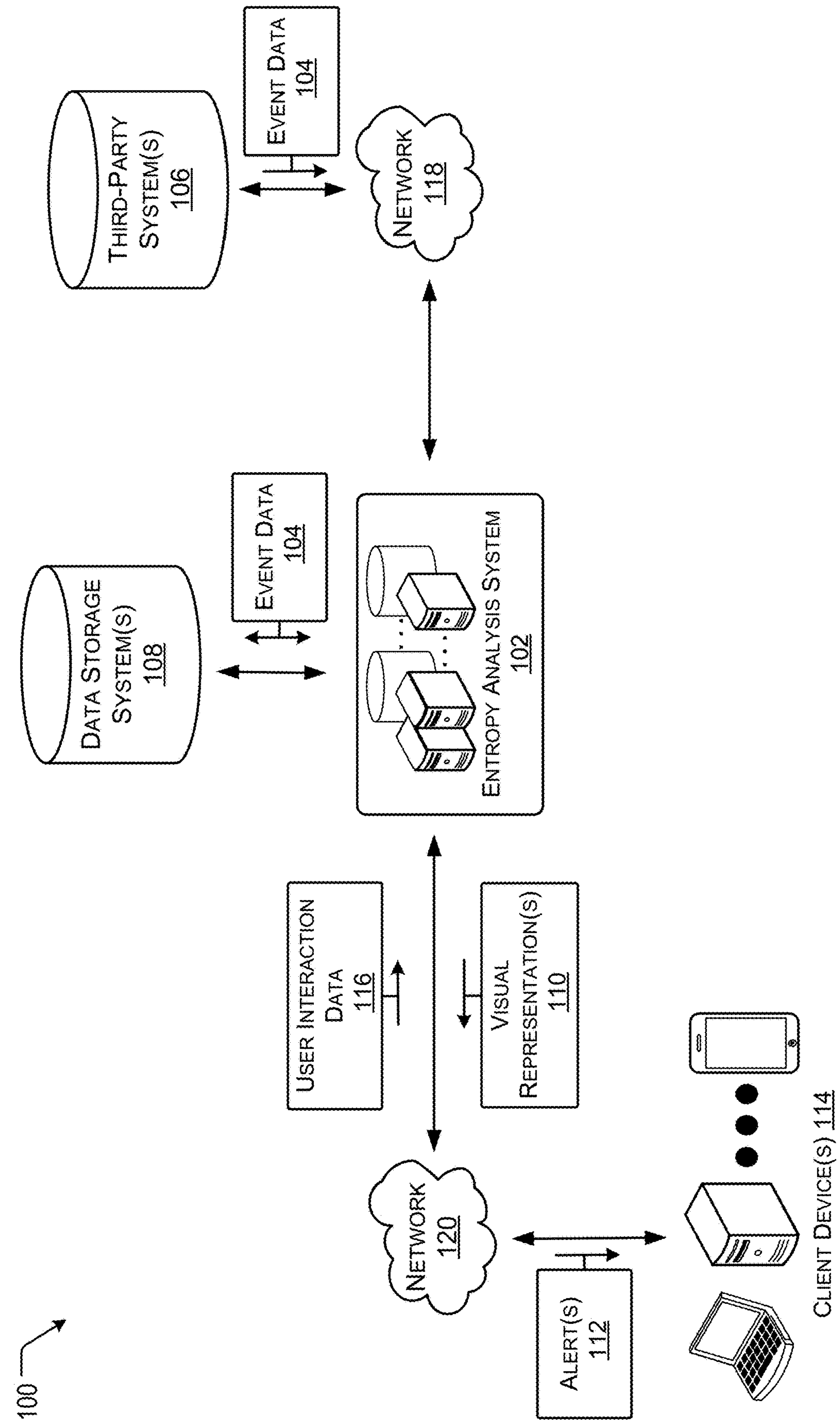
FIG. 1 is an example block diagram of an entropy analysis platform for generating visual representations of entropy of a system or process based at least in part on event data according to some implementations.

Discussed herein is an entropy analysis platform, methods, and/or platforms for determining or otherwise quantitatively measuring complexity or entropy within processes, organizations, activities, events, and systems. The entropy analysis platform may then analyze the entropy within the system to generate visualizations (e.g., graphs, charts, maps, time series, and the like) as well as alerts or other indications of deviations or changes from a known or expected pattern or results. For example, the entropy analysis platform may be configured to receive event data associated with one or more activities of a system or process in the form of an event log. Each event log may represent an activity of the process or system from initialization through completion (e.g., resolution, cancellation, or the like). In this manner, each instance of an activity may be represented as a separate event via an individual event log, such that a collection of event logs may represent the process or system for a given period of time.

In some cases, the entropy analysis platform may determine or measure the entropy of a process or system by first determining a number of total activities within the process or system. For example, the entropy analysis platform may determine, based on the event logs, a total number of activities within the system or process over a defined period of time. The entropy analysis platform may next determine a total number of individual activities within the system or process. For example, each different class or type of activity may be determined and a total count of the number of different classes or types may be determined. In some implementations, the entropy analysis platform may also determine a total number of instances for each class or type of activity represented in the event logs over the defined period of time.

The entropy analysis platform may then determine a complexity within the process or system based at least in part on the total number of activities within the system or process and the total number of individual activities within the system or process. For instance, the entropy analysis platform may perform a Shannon's entropy with the understanding that higher relative entropy systems have more activities or activities that are more likely to occur and lower relative entropy systems have fewer activities or activities which are less likely to occur. In some cases, the entropy analysis platform may, in addition to or in lieu of using Shannon's entropy, determine point entropy estimates and/or time series entropy estimates.

Once the complexity or entropy of a system or process is determined, the entropy analysis platform may generate one or more visualizations of the entropy to assist with representing and understanding of the system or process. In some cases, the entropy analysis platform may generate one or more time series representations of entropy associated with a system or process. For instance, the entropy analysis platform may generate a process or system time series as well as a time series for each individual agent (e.g., an actor that may perform an activity) that may perform an activity. As an illustrative example, a system including the satellites in orbit around the Earth may include multiple agents (e.g., each satellite) that may perform one or more activities at a given period of time. In this example, the entropy analysis platform may generate a time series representation for the system (e.g., a set of satellites in orbit) that may include a value representing entropy (e.g., activities of the set of satellites) plotted along a y-axis and a value representing time (e.g., as a date) along the x-axis. The entropy analysis platform may generate a time series representation for each agent (e.g., satellite) that may include a value representing entropy (activities of the individual satellite) plotted along a y-axis and a value representing time (e.g., again as a date) along the x-axis.

In some cases, each of the time series representation may also include a context window that may be displayed in response to a user interaction with the time series representation. For example, if a user viewing the time series representation selects, hovers over, or otherwise interacts with a particular point along the time series, the entropy analysis platform may cause a display of a corresponding context window. The corresponding context window may include additional information or data associated with entropy of the corresponding date based on the time series, such as individual agents and their contribution to the entropy score.

The entropy analysis platform may also generate one or more bar graph representations associated with the entropy to assist with representing and understanding of the system or process. As an illustrative example, a system including the crime within a city or other region (e.g., such as a geographical region) may include multiple events (e.g., each instance of crime) that may be performed at a given period of time. As another illustrative example, a system representing cyber attacks or hacking within a company or other grouping (e.g., a group of similar companies within the same critical infrastructure sector) may include multiple events (e.g., each instance of a variety of cyber attacks). For instance, similar to the time series representation, the entropy analysis platform may generate a bar representation for the system (e.g., a set of each criminal action within the region) that may include a value representing entropy (e.g., activities of the set of each criminal action) plotted along a y-axis and a value representing time (e.g., as a date) along the x-axis. In some cases, each of the bar representation may also include a context window that may be displayed in response to a user interaction with the bar representation. For example, if a user viewing the bar representation selects, hovers over, or otherwise interacts with a bar, the entropy analysis platform may cause a display of a corresponding context window. The corresponding context window may include additional information or data associated with entropy of the corresponding date, such as individual types or classes of criminal activities performed on the given date, a number of each type or class of criminal activities (e.g., five instances of theft, two instances of burglary, or the like), percentages of each type or class of criminal activities contributing to the entropy within the region, and the like.

The entropy analysis platform may also generate one or more geospatial representations or maps associated with the entropy to assist with representing and understanding of the system or process. For instance, based on the criminal activity example above, the entropy analysis platform may generate one or more geospatial representations that indicate an amount of activity within one or more regions (e.g., a country) and/or sub-regions (e.g., each zip code within the county). In some cases, each of the geospatial representations may also include a context window that may be displayed in response to a user interaction with the bar representation. For example, if a user viewing the geospatial representation selects, hovers over, or otherwise interacts with a region, the entropy analysis platform may display a corresponding context window. The corresponding context window may include additional information or data associated with entropy of the corresponding region, such as individual types or class of criminal activities performed on in the given region, a number of each type or class of criminal activities (e.g., five instances of theft, two instances of burglary, or the like), percentages of each type or class of criminal activities contributing to the entropy within the region, and the like.

In some examples, the entropy analysis platform may generate multiple context windows when a user interacts with a region. For example, a first context window representing a time series and/or trend of activities within the selected region. The entropy analysis platform may generate a second context window with a comparative analysis for the region. For example, the entropy analysis platform may present a context window representing change in entropy over time, change between similar dates of multiple years, change or percentage of particular types or classes of activities (e.g., increase or decrease of theft) within the region, various rankings in comparison to other proximate regions or other proximate sub-regions (e.g., other zip codes, neighborhoods, streets, or the like) within a larger region (e.g., county, city, state, or the like).

The entropy analysis platform may also generate one or more pictorial process representations as an information flow or process model format. For example, the entropy analysis platform may present a context window representing the probabilistic flow of information or activities for the various agents represented within the system.

It should be understood that in various implementations one or more context windows may be displayed concurrently with the original visual representation as well as in combination with other context windows, such that multiple context windows and the original visual representation may be displayed concurrently. It should also be understood that the intervals or steps associated with the various visual representations, discussed herein, may be adjusted or defined by the user viewing the visual representation, by the entropy analysis platform prior to display, or adjusted based on the total period of time being considered or the total quantity of entropy determined over the period. In various examples, any information or data displayed within a context window may correspond to the intervals associated with the visual representation and may be re-determined based on a change in interval, such as if a user viewing the visual representation adjusts a scale, region, set of activities, or focus of the entropy data.

In various implementation, the entropy analysis platform may also be configured to detect changes (such as compared to one or more thresholds) within the entropy of a given system or process and/or with respect to individual activities within a region or period of time. In some cases, the one or more thresholds may be determined based at least in part on historical entropy data captured or generated by the entropy analysis platform over time or entered by a system administrator. In some cases, the one or more thresholds may represent a change in entropy over a given period or region or corresponding period or region (e.g., prior month, same month last year, region with similar demographics, or the like). For example, the entropy analysis platform may utilize entropy time series regression analysis, entropy time series variance analysis, entropy agent time series correlations, or the like as well as one or more machine learned models and/or networks to determine or detect changes within the system.

As described herein, the time series regression analysis may include a statistical analysis that analyzes a relationship between dependent or target variables that are being modeled and/or independent variables that may influence the dependent variables over intervals or periods of time. For instance, the entropy analysis platform may utilize one or more example techniques including autoregressive integrated moving averages (ARIMA), autoregressive integrated moving average with exogenous variables (ARIMAX), recurrent neural networks (RNNs), or the like. In some cases, the entropy analysis platform may also evaluate or score the quality of the time series regression analysis prior to presenting the visual representations to a user. In these cases, the entropy analysis platform may apply mean squared error (MSE), root mean squared error (RMSE), mean absolute error (MAE), or the like to determine the quality of the analysis. The entropy analysis platform may then only present the visual representation when the corresponding time series regression analysis has a quality above one or more quality thresholds.

As described herein, time series variance analysis may include a statistical analysis that determines a variability or fluctuation within data points over an interval or period of time. In this manner, the time series variance analysis may assist with quantifying a deviation in data points at a particular interval from an overall mean of the series. In one illustrative example, the entropy analysis platform may determine a time series variance by determining a mean of the time series then calculating the squared difference between each interval and the mean. Next, the entropy analysis platform may determine a variance metric by averaging square deviation based on the squared differences.

As described herein, agent time series correlation analysis may include determining how two or more agents, events, or variables are related to each other over a series of intervals or periods of time. In some examples, the entropy analysis platform may first determine a correlation between two or more agents over the series or sequence via a correlation analysis technique. The entropy analysis platform may then apply a correlation coefficient to determine if one agent is increasing or decreasing the entropy of the other agent. Some illustrative techniques associated with performing agent time series correlation analysis that may be applied by the entropy analysis platform include cross-correlation analysis, Granger causality, or the like.

As described herein, machine learned (or learning) models and/or networks may be utilized to assist with analyzing the entropy data. In some cases, the machine learned models may be generated using various machine learning techniques. For example, the models may be generated using one or more neural network(s). A neural network may be a biologically inspired algorithm or technique which passes input data (e.g., image and sensor data captured by the IoT (Internet of Things) computing devices) through a series of connected layers to produce an output or learned inference. Each layer in a neural network can also comprise another neural network or can comprise any number of layers (whether convolutional or not). As can be understood in the context of this disclosure, a neural network can utilize machine learning, which can refer to a broad class of such techniques in which an output is generated based on learned parameters.

As an illustrative example, one or more neural network(s) may generate any number of learned inferences or heads from the captured sensor and/or image data. In some cases, the neural network may be a trained network architecture that is end-to-end. In one example, the machine learned models may include segmenting and/or classifying extracted deep convolutional features of the sensor and/or image data into semantic data. In some cases, appropriate truth outputs of the model in the form of semantic per-pixel classifications and recognition.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like. In some cases, the system may also apply Gaussian blurs, Bayes Functions, color analyzing or processing techniques and/or a combination thereof.

As used herein, the term region may represent an arrangement of data associated with a system or process. For example, as used herein, a region may include segmentations, partitions, areas, groupings, sections, arrangements, sets, divisions, classifications, indications of relationships, associations, other organizations of data, or the like. Accordingly, while a region may in some cases represent a geographical area, the use of region, herein, should not be limited to a geographical representation. For instance, as some illustrative examples, the region may include demographic groupings or classifications, cognitive terrain, abstract regions, cognitive regions, satellite class groupings or arrangements, infrastructure groupings, military unit arrangements, maritime vessel classifications, internet protocol addresses, a subset of web pages within a business online presence, vehicle types, drone characteristics, publication outlets, news outlets, wildlife segmentations, plant or tree or vegetation segmentations, or groupings, metric (e.g., height, weight, volume, density, distance, counts, and the like) ranges (such as within one or more bounding thresholds), groupings, arrangements, and the like FIG. 1 is an example block diagram 100 of an entropy analysis platform 102 for generating visual representations of entropy of a system based at least in part on event data. In the current example, the entropy analysis platform 102 may maintain event data 104 associated with one or more activities of a system or process in the form of event logs (such that each log represents an activity within a system or process). In the current example, the event data 104 may be received from a third-party system 106, such as a data store or server associated with an entity that is evaluating or tracking changes in entropy or complexity within a system or process (e.g., a government agency in the satellite and/or criminal activity examples above). In the current example, the event data 104 may be received and organized into event logs which may be stored at the entropy analysis platform 102 or via a remote data storage system 108, as shown.

As discussed herein, the entropy analysis platform 102 may analyze the event data 104 or event logs over a period of time (such as via a series of intervals or steps) to generate visual representation 110 (e.g., graphs, charts, maps, time series, and the like) as well as alerts 112 (or other indications of deviations or changes from a known or expected pattern or results). For example, the entropy analysis platform 102 may be configured to receive event data 104 associated with one or more activities of a system or process and/or individuals engaged in the activities. Each event may represent an activity of the process or system from initialization through completion (e.g., resolution, cancellation, or the like). In this manner, each instance of an activity may be represented as a separate event that may represent the process or system for a given period of time.

In some cases, the entropy analysis platform 102 may determine or measure the entropy or complexity of a process or system by first determining a number of total activities within the process or system for a defined period of time. For example, the entropy analysis platform may determine, based on the event data 104, a total number of activities within the system or process over the defined period of time. The entropy analysis platform 102 may next determine a total number of individual activities within the system or process. For example, each different class or type of activity may be determined and a total count of the number of different classes or types may be determined. In some implementations, the entropy analysis platform 102 may also determine a total number of instances for each class or type of activity represented in the event data 104 over the defined period of time.

The entropy analysis platform may then determine the entropy or complexity within the process or system based at least in part on the total number of activities within the system or process and the total number of individual activities within the system or process. Once the complexity or entropy of a system or process is determined, the entropy analysis platform 102 may generate the visual representation to assist a user with understanding of the system, process, or features of individuals engaged in the activities.

As an illustrative example, the entropy analysis platform 102 may generate one or more time series representations of the system or process over the defined period of time, one or more time series for each individual agent that may perform an activity within the defined period of time, one or more bar representations of the system or process over the defined period of time, one or more geospatial representations or maps of the system or process over the period of time, and the like as well as context windows that may provide additional information associated with each interval of the period of time based at least in part on the system or process, the type or class of agent, the type, class, or quantity of activities, the type of visual representation, or the like. As illustrated, the various visual representations of the process or system may be sent or otherwise provided to one or more client devices 114, such that a user may view or otherwise consume the visual representation 110 in a desired manner.

In some cases, the context windows may be presented on a display of the client device 114 in response to a user of the client device 114 selecting, hovering, or otherwise interacting with a particular region or interval of a visual representation 110. In some cases, user interaction data 116 may be sent back to the entropy analysis platform 102 to cause the entropy analysis platform 102 to provide or otherwise cause the display of the context window via the client device 114. In other cases, the context windows may be provided as part of the visual representation 110 and may be displayed by an application on the client device 114 detecting the user interaction with a visual representation 110.

In the current example, the entropy analysis platform 102 may also be configured generate alerts 112 associated with detected changes (such as compared to one or more thresholds) or deviations from a trend with respect to the entropy of a system or process and/or with respect to individual activities within a region or period of time. In some cases, the one or more thresholds may be determined based at least in part on historical entropy data captured or generated by the entropy analysis platform 102 over time, entered by a system administrator, received from the third-party system 106, or the like.

In some cases, the one or more thresholds may represent a change in entropy over a given period and/or region. For example, the entropy analysis platform may utilize entropy time series regression analysis, entropy time series variance analysis, entropy agent time series correlations, or the like as well as one or more machine learned models and/or networks to determine or detect changes within the system. In this example, if a change or deviation greater than or equal to one or more thresholds is detected, the entropy analysis platform 102 may provide an alert 112 to the client device to notify a user of the deviation. In some cases, the entropy analysis platform 102 may also provide corresponding visual representation 110 associated with the process or system and interval(s) at which the change or deviation was detected to assist the user in understanding, triaging, or the like the cause of change or deviation within the system or process. In some cases, the entropy analysis platform 102 may provide recommendations or suggestions associated with the change or deviation that may assist the user in determining a cause or returning the system or process to the mean if desired.

In the current example, the data, alerts, visualizations, and the like may be transmitted between various systems using networks, generally indicated by networks 118 and 120. The networks 118 and 120 may be any type of network that facilitates compunction between one or more systems and may include one or more cellular networks, radio, WiFi networks, short-range or near-field networks, infrared signals, local area networks, wide area networks, the internet, and so forth. In the current example, each network 118 and 120 is shown as a separate network but it should be understood that two or more of the networks may be combined or the same.

FIGS. 2-8 are flow diagrams illustrating example processes associated with the entropy analysis platform discussed herein. The processes are illustrated as a collection of blocks in a logical flow diagram, which represent a sequence of operations, some or all of which can be implemented in hardware, software, or a combination thereof. In the context of software, the blocks of the flow diagrams represent computer-executable instructions stored on one or more computer-readable media that, when executed by one or more processor(s), performs the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks of the flow diagrams can be combined in any order and/or in parallel to implement the processes, or alternative processes, and not all of the blocks of the flow diagrams need be executed. For discussion purposes, the processes herein are described with reference to the frameworks, architectures and environments described in the examples herein, although the processes may be implemented in a wide variety of other frameworks, architectures, or environments.

Figure 2:
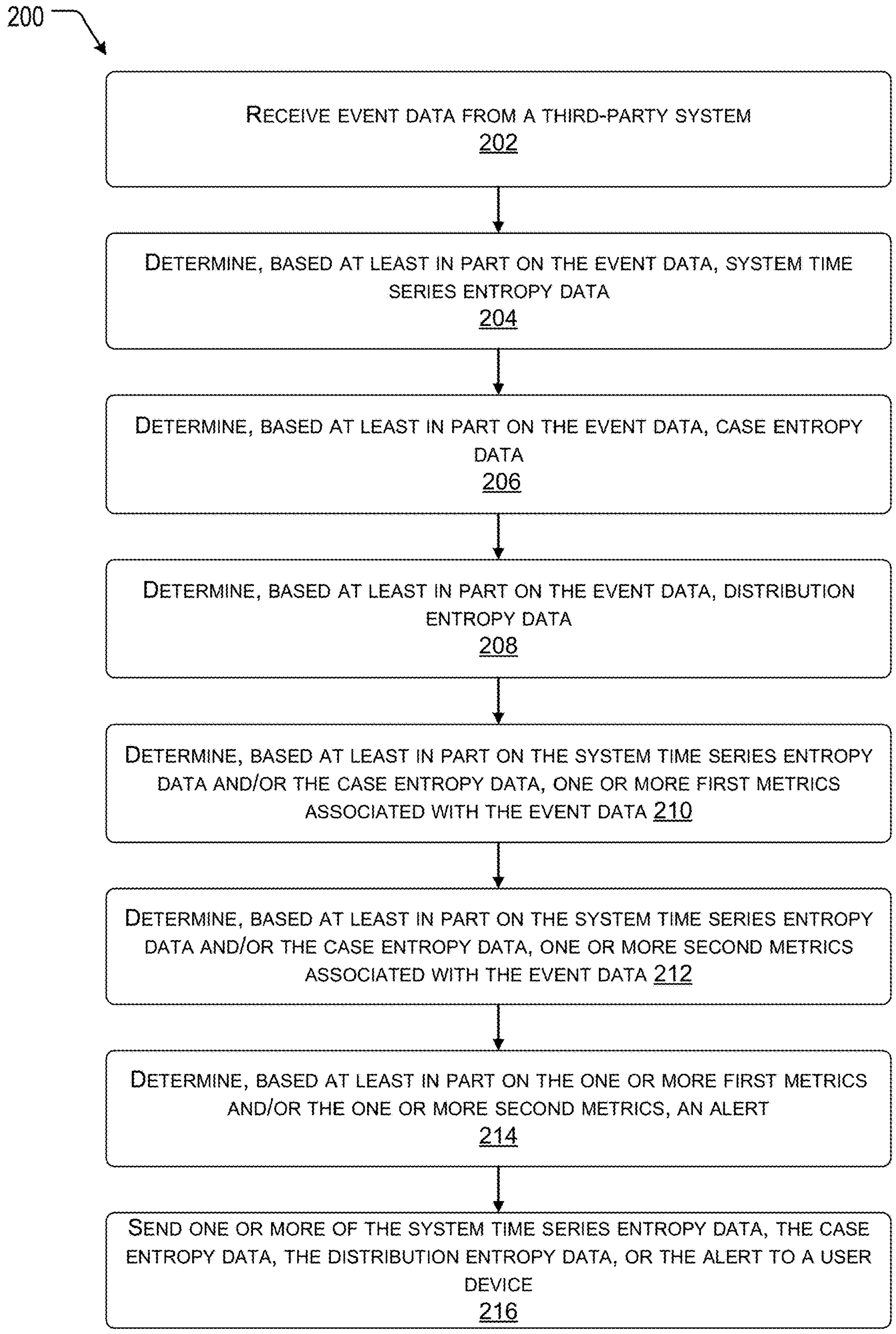
FIG. 2 is a flow diagram illustrating an example process associated with generating visual representations of entropy of a system or process based at least in part on event data according to some implementations.

FIG. 2 is a flow diagram illustrating an example process 200 associated with generating visual representations of entropy of a system or process based at least in part on event data according to some implementations. As discussed herein, an entropy analysis platform may be configured to measures or otherwise determine entropy associated with a process or system as well as changes to the entropy or complexity of the process or system over time. In some cases, the entropy analysis platform may be configured to generate a plurality of visual representations to present the complexity, entropy, or change in entropy to a user.

At 202, the entropy analysis platform may receive event data from a third-party system. For example, the entropy analysis platform may receive event data from a governmental organization or entity, corporation, charity, or the like. The event data may be associated with a particular system or process. In some cases, the entropy analysis platform may organize the event data into one or more event logs representing an activity from initialization to completion. In some cases, the event logs may also be organized into groups or sets based on a defined period of time.

At 204, the entropy analysis platform may determine, based at least in part on the event data (such as a set of event logs associated with the defined period of time), system time series entropy data. In some cases, the system time series entropy data may represent a plurality of intervals (e.g., each millisecond, second, hour, day, week, month, year, or the like) over the defined period of time in which each interval has corresponding data that indicates entropy for that interval based on a number of activities, number of classes or types of activities, number of agents, and the like for the entire system or process.

In some cases, the time series entropy data may be determined using a sliding window over multiple intervals. For example, the entropy analysis platform may determine the entropy data for a system, process, or agent having a set number of possible activities, i, (e.g., activity types or classes that may occur during the interval) by first counting and storing a total number of activities observed during the interval. Next, the entropy analysis platform may count and store a number of each individual activity (e.g., each activity within each class or type) observed during the interval. The entropy analysis platform may then determine a probability, P, of each activity type by dividing the stored number of each individual activity observed by the stored number of total activities observed. The entropy may then be determined for the interval as a sum of a product of each activity probability, P(i), multiplied by the base 2 logarithm of each activity probability, $\log_2 P(i)$, multiplied by −1, or $-\Sigma P(i) \log_2 P(i)$. The entropy analysis platform may then store the entropy value for the interval and repeat for all remaining intervals within the defined period of time and associated with the system or process.

At 206, the entropy analysis platform may determine, based at least in part on the event data (such as a set of event logs associated with the defined period of time), case entropy data. The case entropy data may represent time series entropy data for each agent within a system or process over the plurality of intervals (e.g., each millisecond, second, hour, day, week, month, year, or the like) of the defined period of time. As discussed above, the case entropy data may be determined using a sliding window for each interval based on a number of activities by the agent, number of classes or types of activities by the agent, and the like. In some cases, the case entropy data may be determined using the formula of 204, $-\Sigma P(i) \log_2 P(i)$, with the event data limited to the specific agent.

At 208, the entropy analysis platform may determine, based at least in part on the event data (such as a set of event logs associated with the defined period of time), distribution entropy data. For example, the entropy analysis platform may determine or assign geographic or other data or spatial mapping regions to the system time series entropy data and/or the case entropy data. For instance, the entropy analysis platform may determine a heatmap or regionalized geospatial representation of the system time series entropy data and/or the case entropy data indicating entropy within each region. As an illustrative example, the entropy analysis platform may apply criminal activity entropy data, as determined above, based on regions (such as zip codes, neighbor hoods, distance from a city center or other location, or the like) to generate a visualization representation such as an entropy based heatmap.

At 210, the entropy analysis platform may determine, based at least in part on the system time series entropy data and/or the case entropy data, one or more first metrics associated with the event data. For example, the entropy analysis platform may determine metrics associated with changes in entropy or complexity of the system or process, meeting or exceeding one or more thresholds, deviations from historical entropy data, or the like. In some examples, the entropy analysis platform may utilize time series regression analysis, time series variance analysis, or the like as well as one or more machine learned models or networks to determine the one or more first metrics.

At 212, the entropy analysis platform may determine, based at least in part on the system time series entropy data and/or the case entropy data, one or more second metrics associated with the event data. For example, the entropy analysis platform may perform a comparative analysis between the case entropy data for each agent within the defined period of time associated with the system time series entropy data. As an illustrative example, the entropy analysis platform may perform time series correlation analysis associated with two or more agents, events, or variables. In this manner, the one or more second metrics may represent correlations between two or more agents over the intervals or correlations between the same agent over multiple intervals.

At 214, the entropy analysis platform may determine, based at least in part on the one or more first metrics and/or the one or more second metrics, an alert. For example, the entropy analysis platform may determine if a deviation from expected or historical entropy has occurred, a change of greater than or equal to one or more thresholds has occurred (e.g., either increase or decrease), or the like. The entropy analysis platform may then generate an alert to send to a user device associated with the detected deviation.

At 216, the entropy analysis platform may send one or more of the system time series entropy data, the case entropy data, the distribution entropy data, and/or the alert to a user device. For example, the one or more of the system time series entropy data, the case entropy data, the distribution entropy data, and/or the alert may be sent responsive to detecting the deviation. In some cases, the entropy analysis platform may select the data to send based on the type or class of deviation, a percentage or magnitude of the deviation, or the like.

Figure 3:
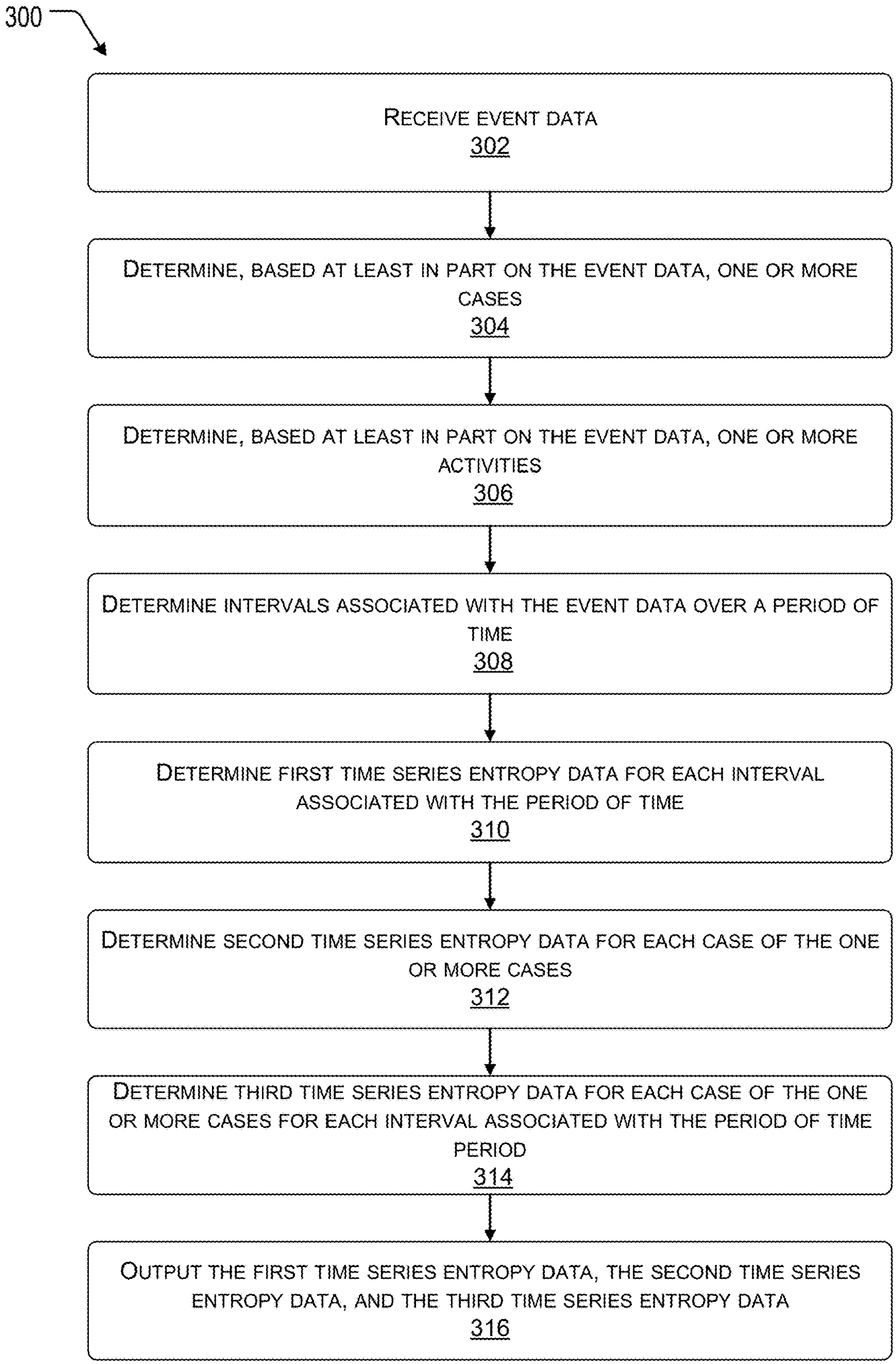
FIG. 3 is a flow diagram illustrating an example process associated with determining system entropy of a system or process according to some implementations.

FIG. 3 is a flow diagram illustrating an example process 300 associated with determining system entropy of a system or process according to some implementations. As discussed above, an entropy analysis platform may determine time series entropy data using a sliding window for the system or process over a defined period of time. The time series entropy data may then be used to generate one or more visual representations of the entropy data for consumption by a user.

At 302, the entropy analysis platform may receive event data. The event data may be received from a third-party system, such as a governmental organization or entity, corporation, charity, or the like or retrieved from a storage location. The event data may be associated with a particular system or process. In some cases, the entropy analysis platform may organize the event data into one or more event logs representing an activity from initialization to completion. In some cases, the event logs may also be organized into groups or sets based on a defined period of time, as discussed herein.

At 304, the entropy analysis platform may determine, based at least in part on the event data, one or more process cases. Each process case may represent an entity that is associated with the system or process being analyzed. A group of process cases may represent a meaningful system component such as a country, a neighborhood, a division within a corporation, a class of vehicle, a demographic, a website or webpage user behavior, or other system characteristics.

At 306, the entropy analysis platform may determine, based at least in part on the event data, one or more activities. Each activity may be associated with the system or process and performed by an agent. In some cases, the activities are predefined into various classes or categories. In this manner, each activity that the agent performs may be assigned to one of the predefined classes or categories.

At 308, the entropy analysis platform may determine intervals associated with the event data over a period of time. For example, the event data may represent the system or process over a period of time. The entropy analysis platform may then determine an appropriate interval size based at least in part on the period of time. For instance, if the period of time represents multiple years, an interval of a year may be appropriate. However, if the period of time represents one day, an interval of one hour may be appropriate.

At 310, the entropy analysis platform may determine first time series entropy data for each interval associated with the period of time. For example, the entropy analysis platform may, for each interval of the period of time, first determine a number of events for all activities associated with the interval. The entropy analysis platform may then, for each interval, determine a total number of each class or type of event. Again, for each interval, the entropy analysis platform may determine a probability that an event associated with each activity class may occur during the interval. The entropy analysis platform may then determine entropy data for each interval based at least in part on the total number of events, the total number of each activity class or type of event, and the probability that each class or type of event may occur in each interval.

At 312, the entropy analysis platform may determine second time series entropy data for each case of the one or more cases. For example, the entropy analysis platform may, for each case, first determine a number of events for all activities associated with the case during the period of time. The entropy analysis platform may then, for each case, determine a total number of each class or type of event during the period of time. Again, for each case, the entropy analysis platform may determine a probability that an event associated with each activity class may occur during the period of time. The entropy analysis platform may then determine entropy data for each case based at least in part on the total number of events, the total number of each activity class or type of event, and the probability that each class or type of event may occur.

At 314, the entropy analysis platform may determine third time series entropy data for each case of the one or more cases for each interval associated with the period of time period. For example, the entropy analysis platform may, for each case within each interval, determine a number of events for all activities associated with the case. The entropy analysis platform may then, for each case within each interval, determine a total number of each class or type of event associated with the case and during each interval. Again, for each case within each interval, the entropy analysis platform may determine a probability that an event associated with each activity class may occur. The entropy analysis platform may then determine entropy data for each case within each interval based at least in part on the total number of events within the interval and associated with the case, the total number of each activity class or type of event within the interval and associated with the case, and the probability that each class or type of event may occur within the interval and associated with the case.

At 316, the entropy analysis platform may output the first time series entropy data, the second time series entropy data, and the third time series entropy data. In some cases, prior to outputting the first time series entropy data, the second time series entropy data, and the third time series entropy data, the entropy analysis platform may generate a visual representation of each of first time series entropy data, the second time series entropy data, and the third time series entropy data. Each of the visual representation may also include context windows that may be displayed in response to a user interaction with a case, an interval, or the like. In some specific implementations, the visual representation may also be regionalized. In some cases, prior to outputting the first time series entropy data, the second time series entropy data, and the third time series entropy data may be presented in the form of a heatmap or other discretized visualization.

Figure 4:
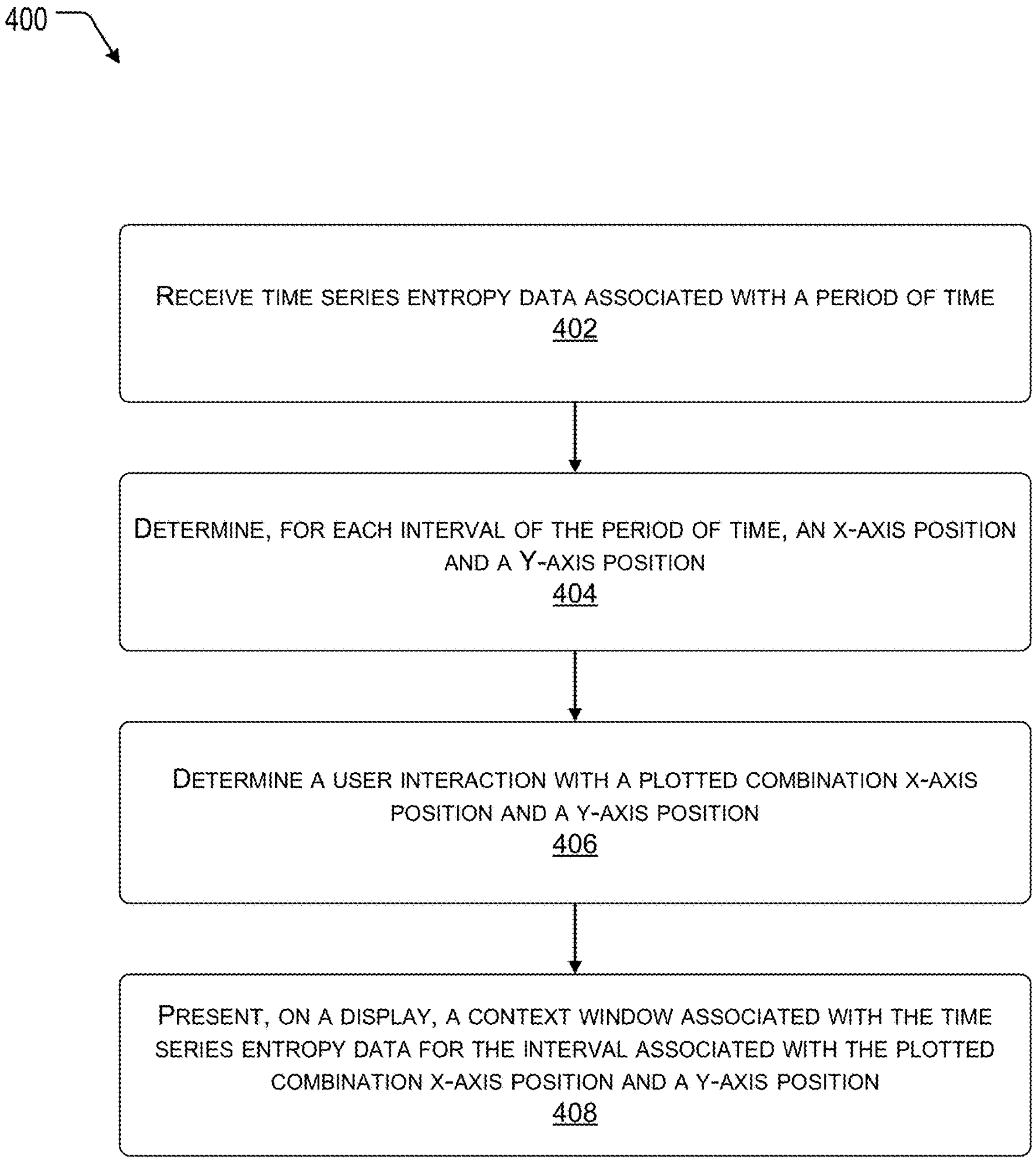
FIG. 4 is a flow diagram illustrating an example process associated with generating a time series visualization associated with entropy of a system or process according to some implementations.

FIG. 4 is a flow diagram illustrating an example process 400 associated with generating a time series visualization associated with entropy of a system or process according to some implementations. As discussed above, an entropy analysis platform may generate one or more visualizations for the entropy data associated with a system or process over a given or defined period of time to assist a user with understanding complexity, changes in complexity, and/or determining measures to alter or change (e.g., in some cases, to reduce) the entropy of the system or process.

At 402, the entropy analysis platform may receive time series entropy data associated with a period of time. For example, the time series entropy data may be associated with intervals of the period of time, cases associated with the system or process, or both the intervals and cases as discussed above with respect to process 300 of FIG. 3.

At 404, the entropy analysis platform may determine, for each interval of the period of time, an x-axis position and a y-axis position associated with a visualization of the time series entropy data. For example, a quantity or amount of entropy may be plotted along the y-axis and the intervals may be plotted along the x-axis to generate the time series visualization for the time series entropy data. In some cases, a region may be defined around the combined y-axis position and x-axis position. The region may be determined based on a predetermined distance (such as a radius), the size or length of the intervals, a number of intervals, an amount of entropy, or the like.

At 406, the entropy analysis platform (or a user device hosted application associated with the entropy analysis platform) may determine a user interaction with a plotted combination x-axis position and a y-axis position. For example, the entropy analysis platform may determine an interaction with the region of the visual representation defined at 404.

At 408, the entropy analysis platform (or the user device hosted application associated with the entropy analysis platform) may present, on a display of the user device, a context window associated with the time series entropy data for the interval associated with the plotted combination x-axis position and a y-axis position. As discussed herein, the context window may include additional entropy data associated with the selected interval, case, agent, or the like.

Figure 5:
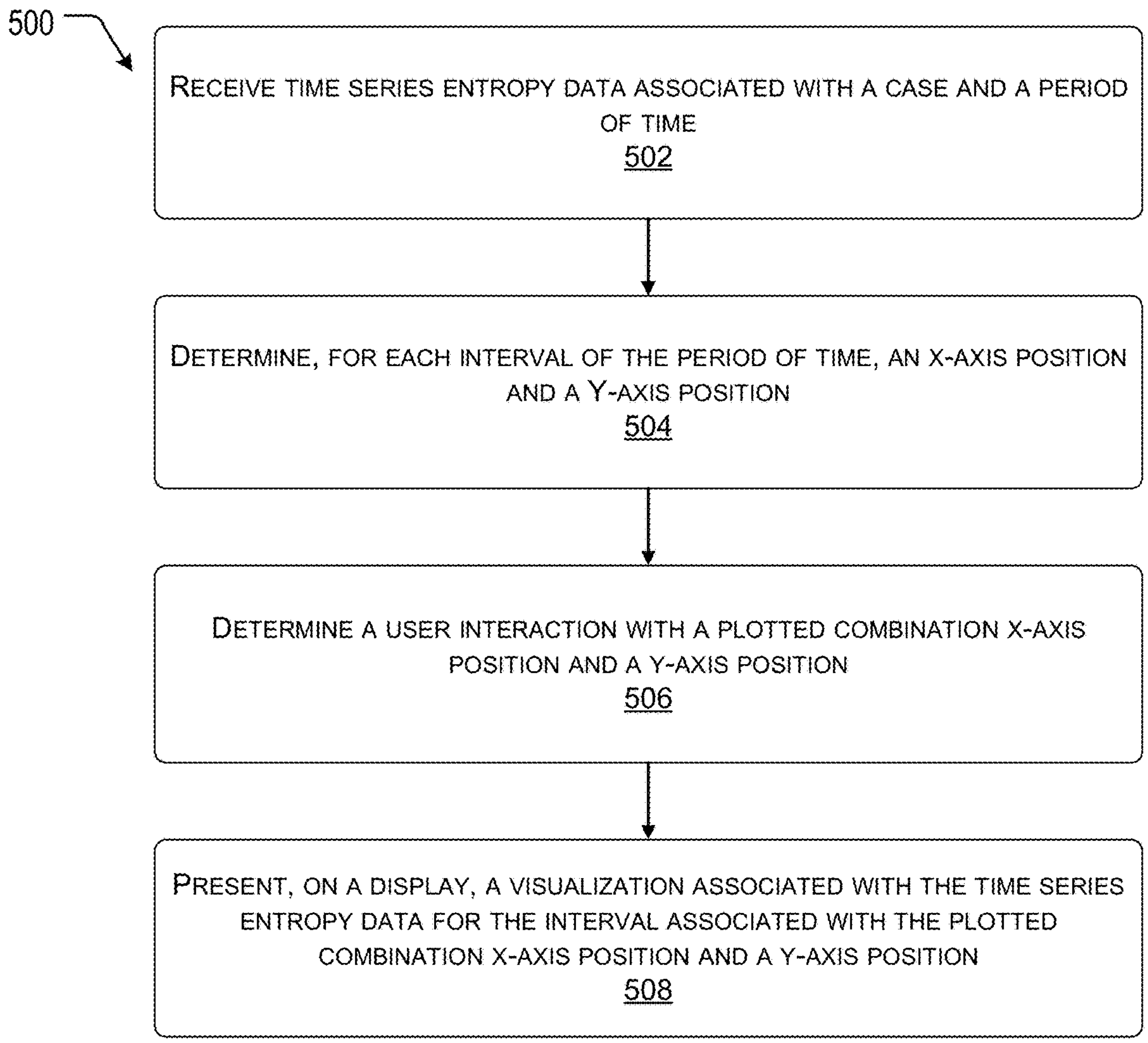
FIG. 5 is another flow diagram illustrating an example process associated with generating a time series visualization associated with entropy of a system or process according to some implementations.

FIG. 5 is another flow diagram illustrating an example process 500 associated with generating a time series visualization associated with entropy of a system or process according to some implementations. In the current example, the time series visualization may be generated for an individual case or agent over the period of time.

At 502, the entropy analysis platform may receive time series entropy data associated with a case and a period of time. For example, the time series entropy data may be associated events performed by an agent or associated with a case and performed within one or more intervals of the period of time. In some cases, the per case time series entropy data may be generated as discussed above in process 300 of FIG. 3.

At 504, the entropy analysis platform may determine, for each interval of the period of time, an x-axis position and a y-axis position associated with a visualization of the time series entropy data of the specific case. For example, a quantity or amount of entropy may be plotted along the y-axis and the intervals may be plotted along the x-axis to generate the time series visualization for the time series entropy data. In some cases, a region may be defined around the combined y-axis position and x-axis position. The region may be determined based on a predetermined distance (such as a radius), the size or length of the intervals, a number of intervals, an amount of entropy, or the like.

At 506, the entropy analysis platform (or a user device hosted application associated with the entropy analysis platform) may determine a user interaction with a plotted combination x-axis position and a y-axis position. For example, the entropy analysis platform may determine an interaction with the region of the visual representation defined at 504.

At 508, the entropy analysis platform (or the user device hosted application associated with the entropy analysis platform) may present, on a display of the user device, a context window associated with the time series entropy data for the interval associated with the plotted combination x-axis position and a y-axis position. As discussed herein, the context window may include additional entropy data associated with the selected interval, case, agent, or the like.

Figure 6:
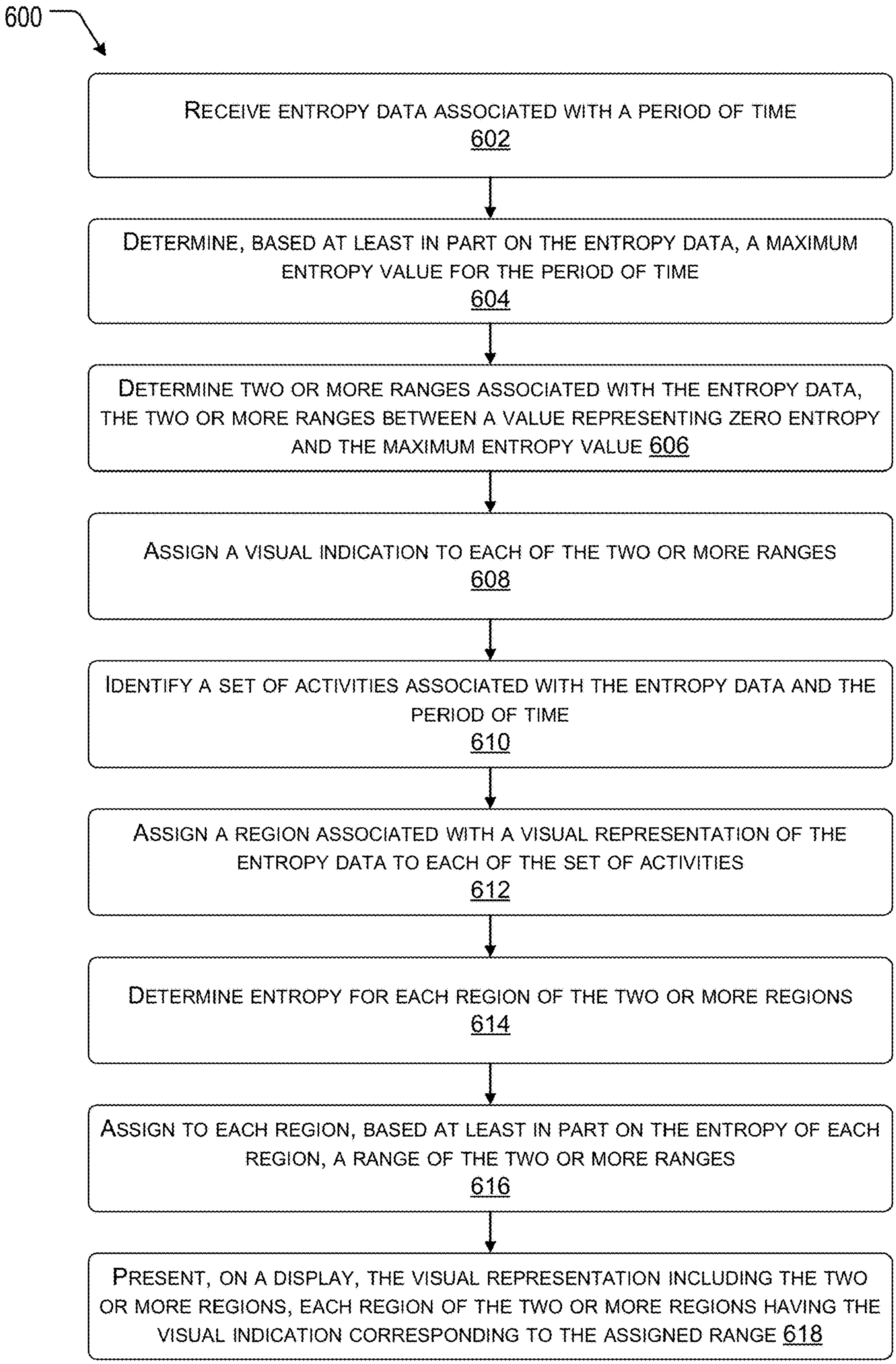
FIG. 6 is a flow diagram illustrating an example process associated with generating a visual representation associated with entropy of a system or process according to some implementations.

FIG. 6 is a flow diagram illustrating an example process 600 associated with generating a visual representation associated with entropy of a system or process according to some implementations. In some examples, the entropy data may be plotted as a heatmap, geospatial representation, or other visual representation illustrating entropy of a system or process organized by one or more regions.

At 602, the entropy analysis platform may receive entropy data associated with a period of time. For example, the entropy data may be associated events performed by one or more agents within the period of time. For example, the entropy data may represent criminal activity within a region, such as a city, country, state, or the like. In some examples, the entropy data may represent measures are useful for making cognitive inferences about the individuals who are engaged with or within systems, such as, in this example, the criminal activity.

At 604, the entropy analysis platform may determine, based at least in part on the entropy data, a maximum entropy value for the period of time. For example, the maximum entropy value may be calculated as $-\Sigma$ P(i) $\log_2$ P(i), where the probability for each activity, P(i), is the same for all activities represented in the entropy data associated with a period of time. In some examples, the maximum entropy value for the period of time may also be determined as the entropy value of a region of the visual representation having the highest entropy value. In these examples, the maximum entropy value and the two or more regions may be determined after assigning activities to regions as discussed below.

At 606, the entropy analysis platform may determine two or more ranges associated with the entropy data, the two or more ranges between a value representing zero entropy and the maximum entropy value. In some cases, the number of ranges may be defined by a third-party, such as the third-party associated with the entropy data or the like. As one example, the entropy analysis platform may include a three range set, such as high, medium, and/or low entropy. As another example, the entropy analysis platform may include a five range set. In one specific example, the entropy analysis platform may determine a number of ranges based at least in part on spread associated with the entropy data (e.g., a difference value between zero entropy and the maximum entropy value). In this specific example, the entropy analysis platform may apply a ranges having a predetermined size (e.g., a value of 5, 10, 15, or the like). In some cases, the size of the range may be set by a third-party, such as the third-party associated with the entropy data or the like. In other cases, the entropy analysis platform may dynamically assign a continuous range of values.

At 608, the entropy analysis platform may assign a visual indication to each of the two or more ranges. For example, the entropy analysis platform may assign a color, such as green, yellow, orange, red, or the like to each range. In other cases, the visual indication may include shading, hatching, or even dynamic indications, such as flashing, blinking, color changes, or the like.

At 610, the entropy analysis platform may identify a set of activities associated with the entropy data and the period of time. For example, the entropy analysis platform may identify each activity with the entropy data during the period of time.

At 612, the entropy analysis platform may assign a region associated with a visual representation of the entropy data to each of the set of activities. For example, the entropy analysis platform may assign the identified activities to regions (classifications, groupings, segments, or the like) based on a correspondence between the activity and each region. In some cases, the regions may be cognitive terrain regions associated with cognitive inferences about the individuals who are engaged with or within the set of activities.

At 614, the entropy analysis platform may determine entropy for each region of the two or more regions. For example, based on the assigned activities, the entropy analysis platform may determine entropy for each region ((classifications, groupings, segments, or the like).

At 616, the entropy analysis platform may assign to each region, based at least in part on the entropy of each region, a range of the two or more ranges. For example, the platform may assign a range by comparing the entropy for each region to the entropy associated with each range.

At 618, the entropy analysis platform may present, on a display, the visual representation including the two or more regions, each region of the two or more regions having the visual indication corresponding to the assigned range. For example, the entropy analysis platform may plot each of the entropy values on a visual representation. In some examples, the entropy analysis platform may plot the entropy for each region and provide context windows in response to user interactions with the corresponding regions of the visual representation.

Figure 7:
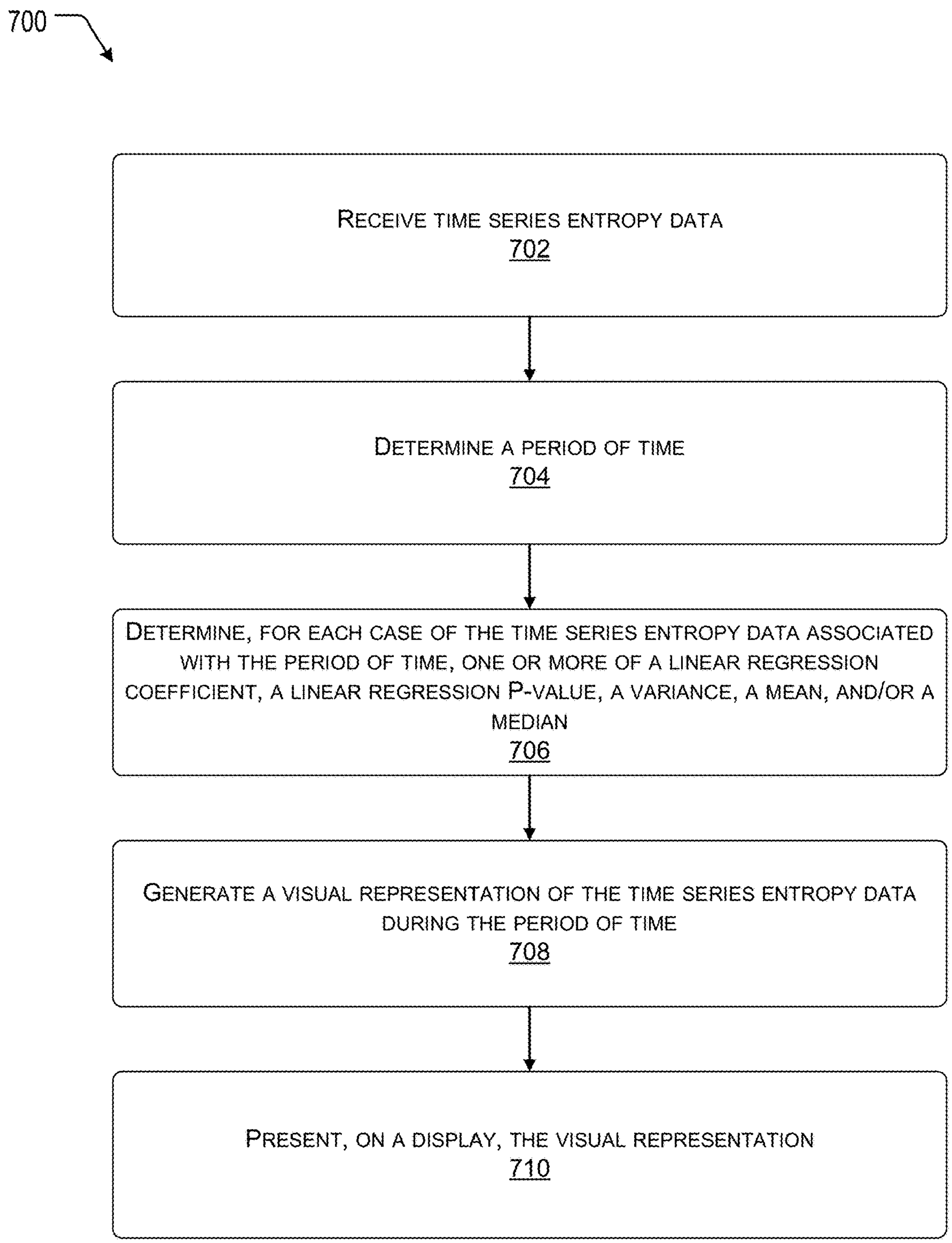
FIG. 7 is a flow diagram illustrating an example process associated with analyzing time series entropy data associated with a system or process according to some implementations.

FIG. 7 is a flow diagram illustrating an example process 700 associated with analyzing time series entropy data associated with a system or process according to some implementations. As discussed herein, the entropy data, such as the time series entropy data of a period of time, case, or a case over a period of time, may be analyzed to detect deviations or changes that may cause the entropy analysis platform to issue or send an alert to a user device.

At 702, the entropy analysis platform may receive time series entropy data. In some cases, the time series entropy data may be associated with a case and/or a period of time. For example, the time series entropy data may be associated events performed by an agent and performed within one or more intervals of the period of time.

At 704, the entropy analysis platform may determine a period of time. For example, the period of time may be received by a third-party, such as the third-party associated with the entropy data. In various example, the period of time may be a subset of a period represented by the time series entropy data.

At 706, the entropy analysis platform may determine, for each case of the time series entropy data associated with the period of time, one or more of a linear regression coefficient, a linear regression P-value, a variance, a mean, and/or a median. For example, the entropy analysis platform may apply various time series regression techniques, time series variance techniques, and the like to determine the one or more of the linear regression coefficient, the linear regression P-value, the variance, the mean, and/or the median.

At 708, the entropy analysis platform may generate a visual representation of the time series entropy data during the period of time and, at 710, the entropy analysis platform may present, on a display, the visual representation (such as a cause the visual representation to be presented on a display of a user device). For example, the entropy analysis platform may plot each of the entropy values determined on a time series visual representation. The entropy analysis platform may also plot the linear regression line using the x-axis (e.g., dates) and y-axis (e.g., entropy values) and the like. In some examples, the entropy analysis platform may plot the linear regression line and provide context window in response to user interactions with the visual representation to provide the one or more of the linear regression coefficient, the linear regression P-value, the variance, the mean, and/or the median as various intervals or positions along the linear regression line.

Figure 8:
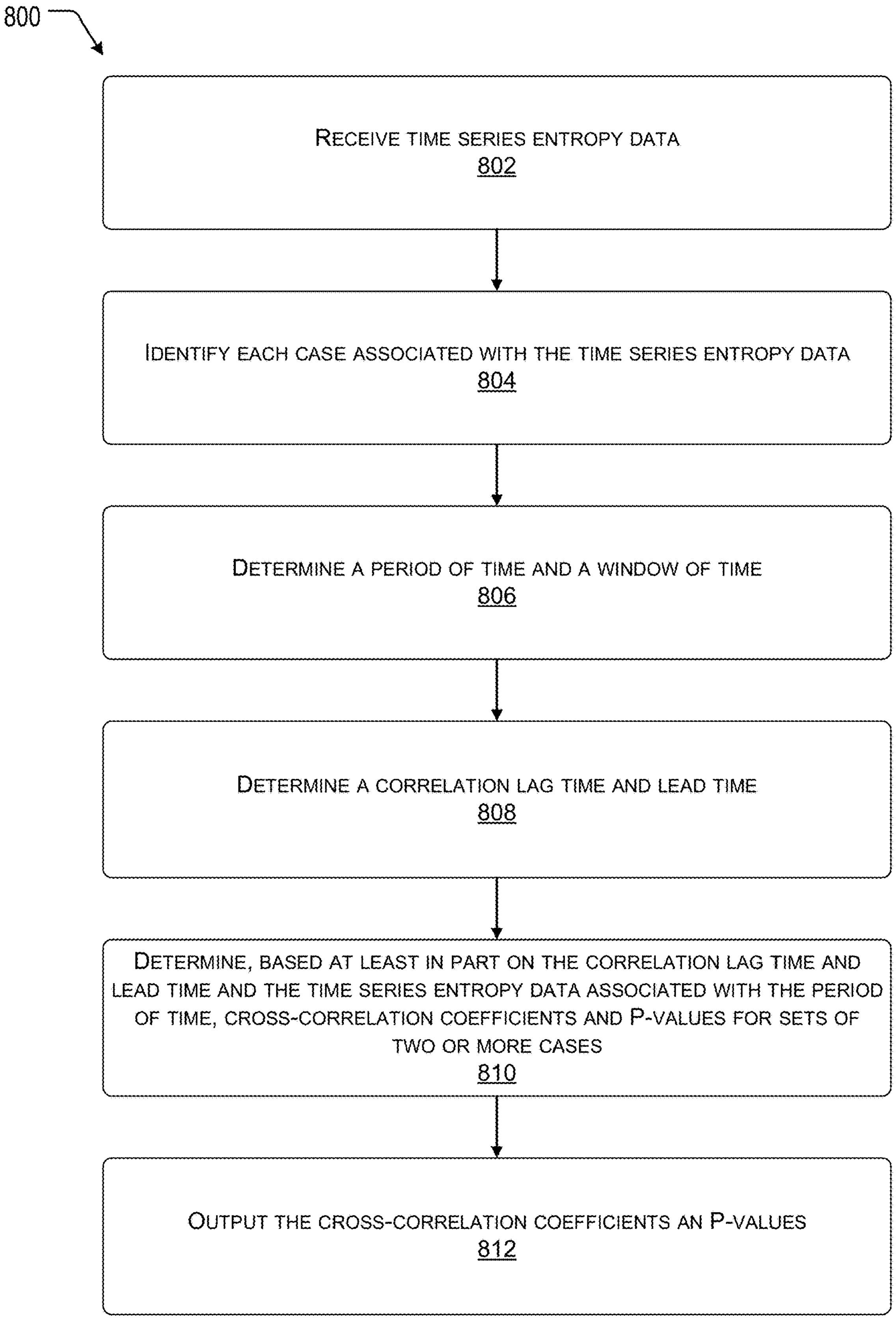
FIG. 8 is a flow diagram illustrating an example process associated with cross-correlating time series entropy data associated with systems or processes according to some implementations.

FIG. 8 is a flow diagram illustrating an example process 800 associated with cross-correlating time series entropy data associated with systems or processes according to some implementations. As discussed herein, the entropy data, such as the time series entropy data of a period of time, case, or a case over a period of time, may be analyzed to detect deviations or changes that may cause the entropy analysis platform to issue or send an alert to a user device.

At 802, the entropy analysis platform may receive time series entropy data. In some cases, the time series entropy data may be associated with a process case and/or a period of time. For example, the time series entropy data may be associated events performed by an agent and performed within one or more intervals of the period of time.

At 804, the entropy analysis platform may identify each process case or group of similar process cases associated with the time series entropy data and, at 806, the entropy analysis platform may determine a period of time and a window of time. The window of time is selected to compare entropy time series subsets. For each analysis, the window of time is advanced one time step and repeated until the time series is analyzed completely. For example, if the window of time is defined as 30 days with one day time incrementation, the first analysis time window will include days 1 through 30, the second analysis will include days 2 through 31, and so on.

At 808, the entropy analysis system may determine a correlation lag time and lead time. Lead and lag times are defined in order to assess relationships between entropy time series. For example, correlation relationships between two or more neighborhood crime entropy time series may discovered by leading or lagging one time series relative to another. For daily time series, a day might be selected as the lead and lag time step. For a monthly time series, a month may be chosen as the lead and lag time step.

At 810, the entropy analysis platform may determine, based at least in part on the correlation lag time and lead time and the time series entropy data associated with the period of time, cross-correlation coefficients and P-values for sets of two or more cases. For example, the entropy analysis platform may apply one or more time series correlation techniques and the like based at least in part on the sliding window, the correlation lag time and lead time, and the like to the per case based entropy time series entropy data.

At 812, the entropy analysis platform may output the cross-correlation coefficients and P-values. For instance, the entropy analysis platform may send the cross-correlation coefficients and P-values to a user device. In some cases, the entropy analysis platform may generate a visual representation of the cross-correlation coefficients and P-values and output the visual representation to the user device. In some examples, the entropy analysis platform may generate an alert based at least in part on the cross-correlation coefficients and P-values and output the alert to the user device (such as in the case of a deviation greater than or equal to one or more alert thresholds, change thresholds, magnitude thresholds, or the like).

Figure 9:
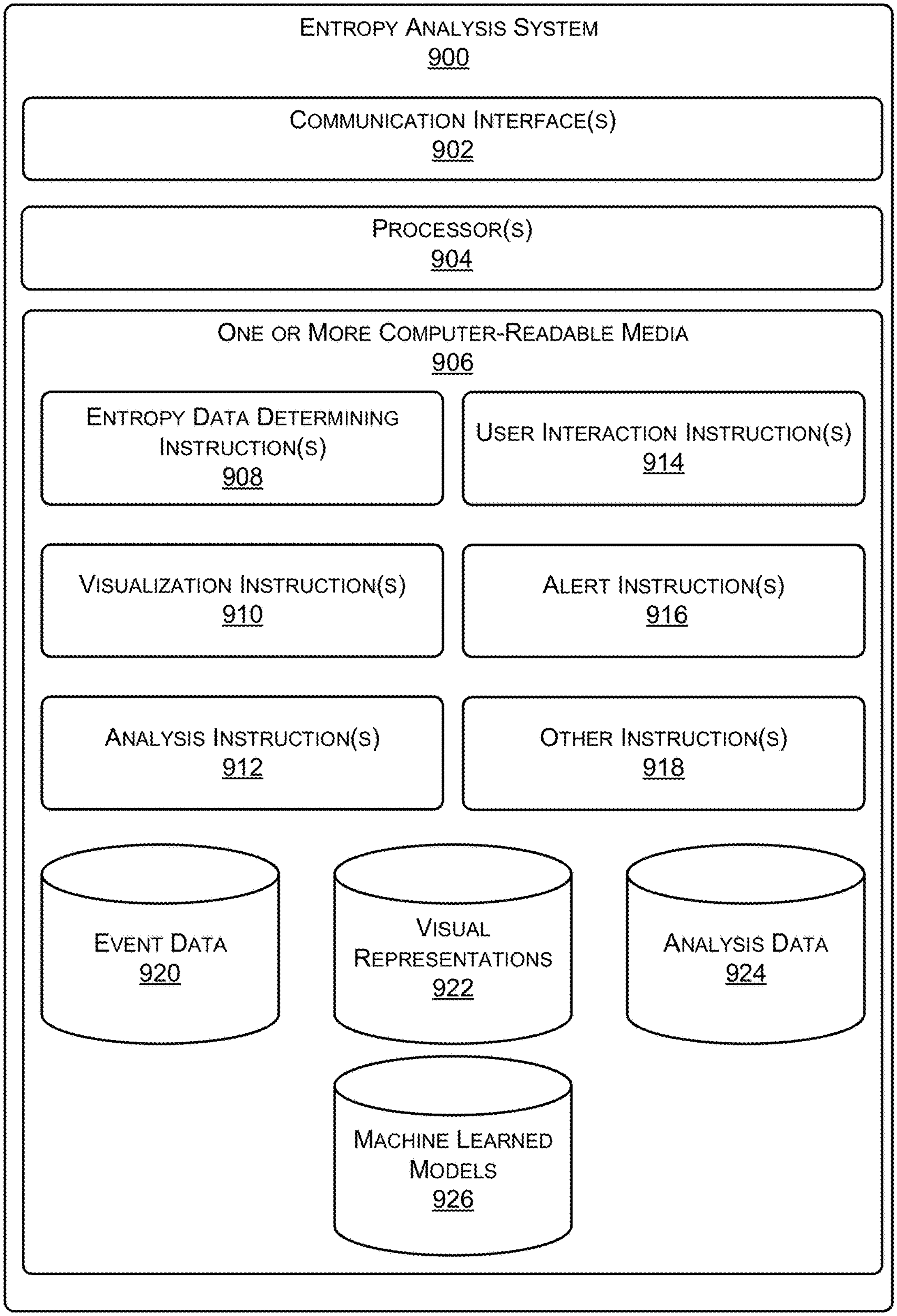
FIG. 9 is an example entropy analysis platform that may implement the techniques described herein according to some implementations.

FIG. 9 is an example entropy analysis platform 900 that may implement the techniques described herein according to some implementations. The entropy analysis platform 900 may include one or more communication interfaces(s) 902 that enable communication between the entropy analysis platform 900 and one or more other local or remote computing device(s), such as the data stores, third-party systems, and user devices as discussed herein. For instance, the communication interface(s) 902 can facilitate communication with other proximity sensor systems, a central control system, or other facility systems. The communications interfaces(s) 902 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

The entropy analysis management system 900 may include one or more processors 904 and one or more computer-readable media 906. Each of the processors 904 may itself comprise one or more processors or processing cores. The computer-readable media 906 is illustrated as including memory/storage. The computer-readable media 906 may include volatile media (such as random access memory (RAM)) and/or nonvolatile media (such as read only memory (ROM), Flash memory, optical disks, magnetic disks, and so forth). The computer-readable media 906 may include fixed media (e.g., GPU, NPU, RAM, ROM, a fixed hard drive, and so on) as well as removable media (e.g., Flash memory, a removable hard drive, an optical disc, and so forth). The computer-readable media 906 may be configured in a variety of other ways as further described below.

Several modules such as instructions, data stores, and so forth may be stored within the computer-readable media 906 and configured to execute on the processors 904. For example, as illustrated, the computer-readable media 906 stores entropy data determining instructions 908, visualization instructions 910, analysis instructions 912, user interaction instructions 914, alert instructions 916, as well as other instructions 916, such as an operating system. The computer-readable media 906 may also be configured to store data, such as event data 920, visual representations 922, analysis data 924, machine learned models 926, as well as other data.

Figure 10:
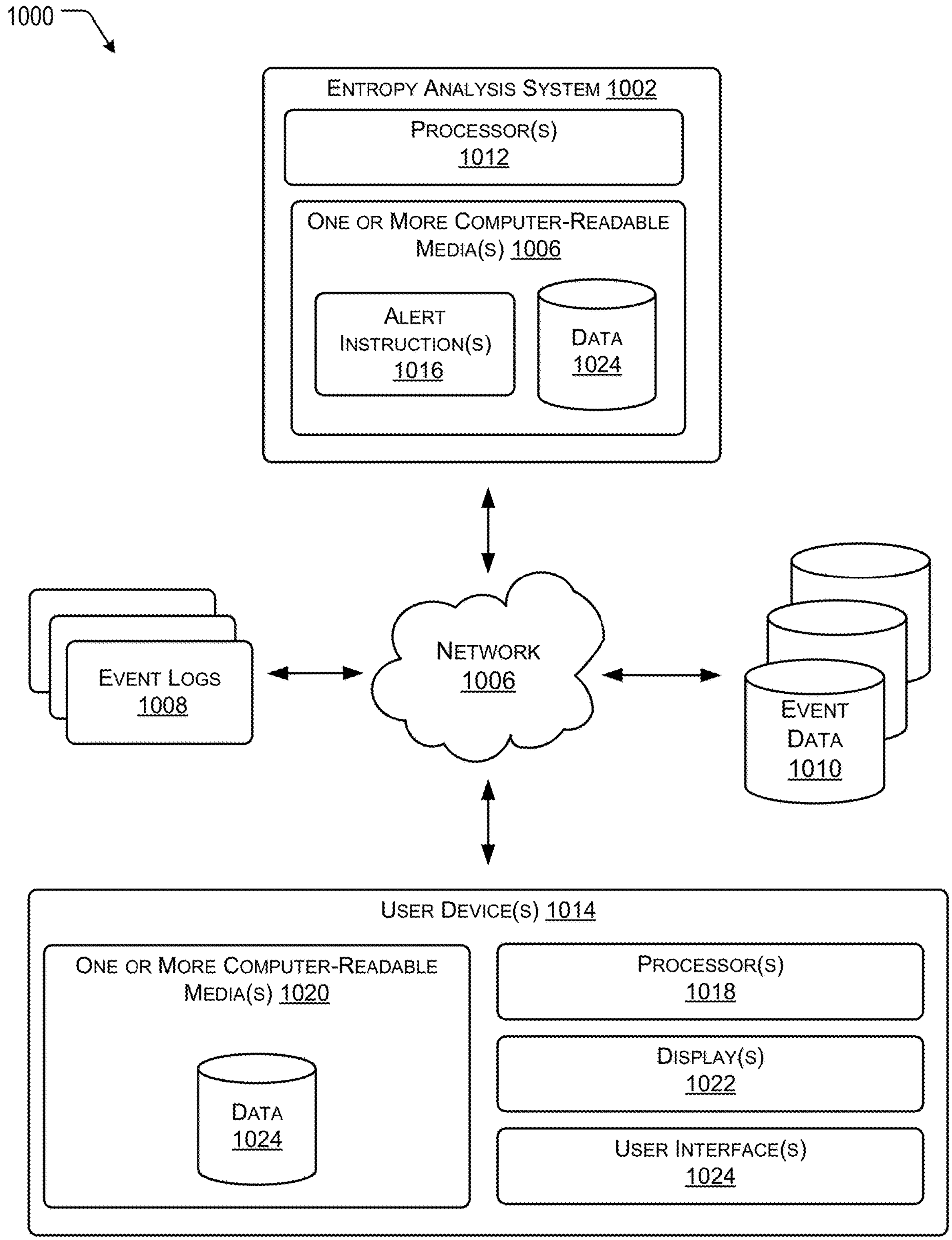
FIG. 10 illustrates an overview of an exemplary computing environment according to some implementations.

FIG. 10 illustrates an overview of an exemplary computing environment 1000 according to some implementation. The computing environment 1000 may include a server, such as entropy analysis platform 1002, one or more client devices 1004 communicatively coupled to the entropy analysis platform 1002 via one or more networks 1006. In some cases, the entropy analysis platform 1002 and/or the user devices 1004 may have access to event logs 1008 and event data 1010 via the one or more networks 1006, as illustrated.

The entropy analysis platform 1002 may be a computing device configured to analyze relevant parameters and using the extracted information to identify problems, develop solutions, and/or present system recommendations. For example, the entropy analysis platform 1002 may be configured to generate visual representations of the event logs 1008 and/or event data 1010, as discussed herein. In different embodiments, the entropy analysis platform 1002 may include a mainframe computer, a server computer, a desktop computer, a laptop computer, a tablet computer, a network computing device, a mobile computing device, and so on.

The entropy analysis platform 1002 may comprise a logic subsystem, such as a processor 1012, and a data-holding subsystem, such as a memory 1006. The entropy analysis platform 1002 may optionally include a display subsystem, a communication subsystem, a user interface subsystem, and other components. The processor 1012 may comprises one or more physical devices configured to execute one or more instructions. For example, processor 1012 may execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The processor 1012 may thus include one or more processors configured to execute software instructions. Additionally, or alternatively, the processor 1012 may comprise one or more hardware or firmware logic machines configured to execute hardware or firmware instructions. The processor 1012 may be single or multi-core, and the programs executed thereon may be configured for parallel or distributed processing. The processor 1012 may optionally include individual components that are distributed throughout two or more devices, which may be remotely located and/or configured for coordinated processing. Such devices may be connected via the one or more network 1006 which may be a public, private or hybrid public/private network. In some aspects, the one or more network 1006 may be the Internet or one or more wired or wireless networks (e.g., an Internet Protocol (IP)-based local area network (LAN), metropolitan area network (MAN) wide area network (WAN), a Wireless LAN (WLAN) network such as Wireless Fidelity (WiFi), and/or a cellular telecommunications network such as Global System for Mobile Communications (GSM) network, 3G network, or long term evolution (LTE) network).

The one or more computer-readable media 1014 of the entropy analysis platform 1002 may comprise one or more physical, non-transitory devices configured to hold data and/or instructions executable by the processor 1012 to implement the methods and processes described herein. When such methods and processes are implemented, the state of the one or more computer-readable media 1014 may be transformed (for example, to hold different data). For example, the one or more computer-readable media 1014 may include removable media and/or built-in devices. The one or more computer-readable media 1014 may include optical memory (for example, CD, DVD, HD-DVD, Blu-Ray Disc, etc.), and/or magnetic memory devices (e.g., hard drive disk, floppy disk drive, tape drive, MRAM, etc.), and the like. The one or more computer-readable media 1014 may include devices with one or more of the following characteristics: volatile, non-volatile, dynamic, static, read/write, read-only, random access, sequential access, location addressable, file addressable, and content addressable. In some embodiments, the processor 1012 and the one or more computer-readable media 1014 may be integrated into one or more common devices, such as an application-specific integrated circuit or a system on a chip.

The user device 1004 may comprise any suitable computing device configured to access a network such as one or more networks 1006, including but not limited to a personal desktop computer, a laptop computer, a smartphone, a tablet computer, and the like. While one user device 1004 is shown, it should be appreciated that any number of client devices operated by respective users. The user device 1004 may comprise a processor 1018, one or more computer-readable media 1020, a display 1022, and a user interface 1024. Similar to the processor 1012, the processor 1018 of the user device 1004 may include one or more processors configured to execute software instructions. Further, the one or more computer-readable media 1020 of the user device 1004 may include one or more physical, non-transitory devices configured to hold data and/or instructions executable by the processor 1018 to implement the methods and processes described herein. Further, in some examples, a plurality of event logs 1008 may be stored in the one or more computer-readable media 1020.

The display 1022 may be used to present a visual representation of data held by the memory 1020. For example, results of the event log analysis, alerts, and visual representations generated by the entropy analysis platform 1002 may be transmitted to the client device and displayed to a user of the client device via the display system 1022. The display 1022 may include one or more display devices utilizing virtually any type of display technology such as, but not limited to, CRT, LCD, LED, OLED, ELD, PD, AMOLED, and QD displays. As another example, the display 1022 may comprise a display projector device, such as a DLP projector, an ICoS projector, a laser projector, an LED projector. As yet another example, the display 1022 may comprise an augmented reality (AR) display system, a virtual reality (VR) display system, or a mixed reality (MR) display system. Such display devices may be combined with the processor 1018 and the one or more computer-readable media 1020 in a shared enclosure, or such display devices may be peripheral display devices.

A user interface 1024 of the user device 1004 may comprise one or more user input devices such as keyboards, mice, game controllers, cameras, microphones, touch screens, and so on. In some cases, the display 1022 and the user interface 1024 may be combined, such as in a touch enabled display.

Figure 11:
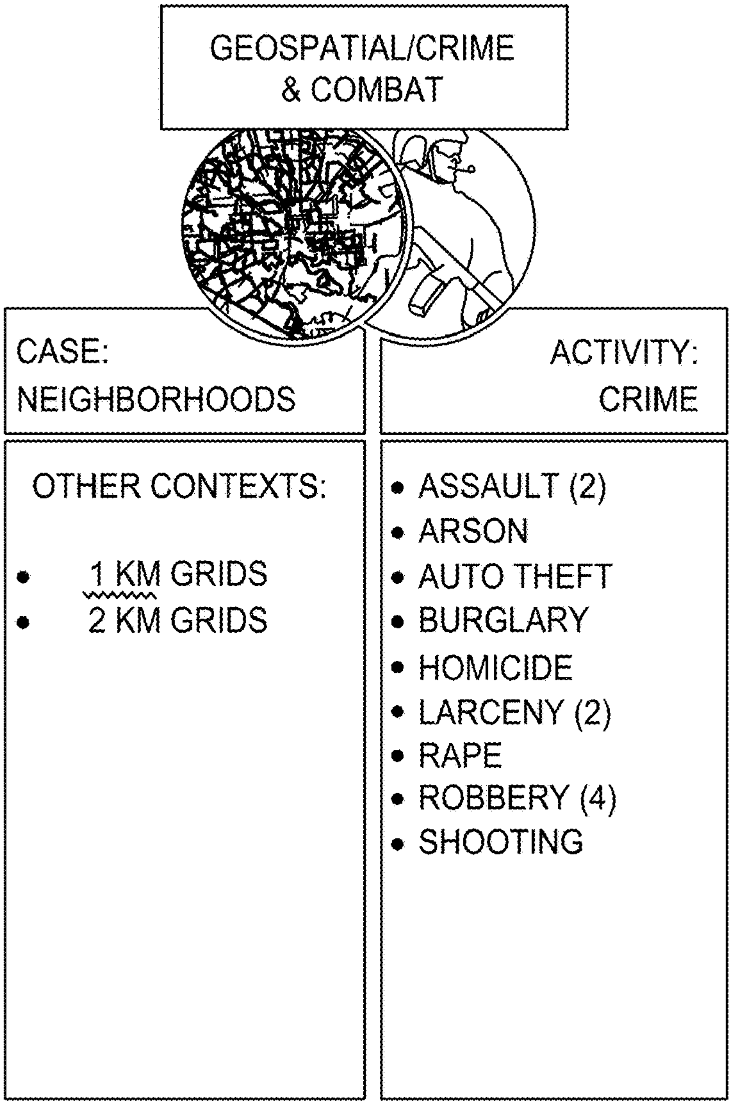
FIG. 11 illustrates an example case according to some implementations.

FIG. 11 illustrates an example case 1100 according to some implementation. In the current example, the case data is associated with criminal activities within a physical environment (e.g., a neighborhood). In this example, there are nine types of activities (e.g., nine crimes that are being monitored) that may be performed within the physical environment.

Figure 12:
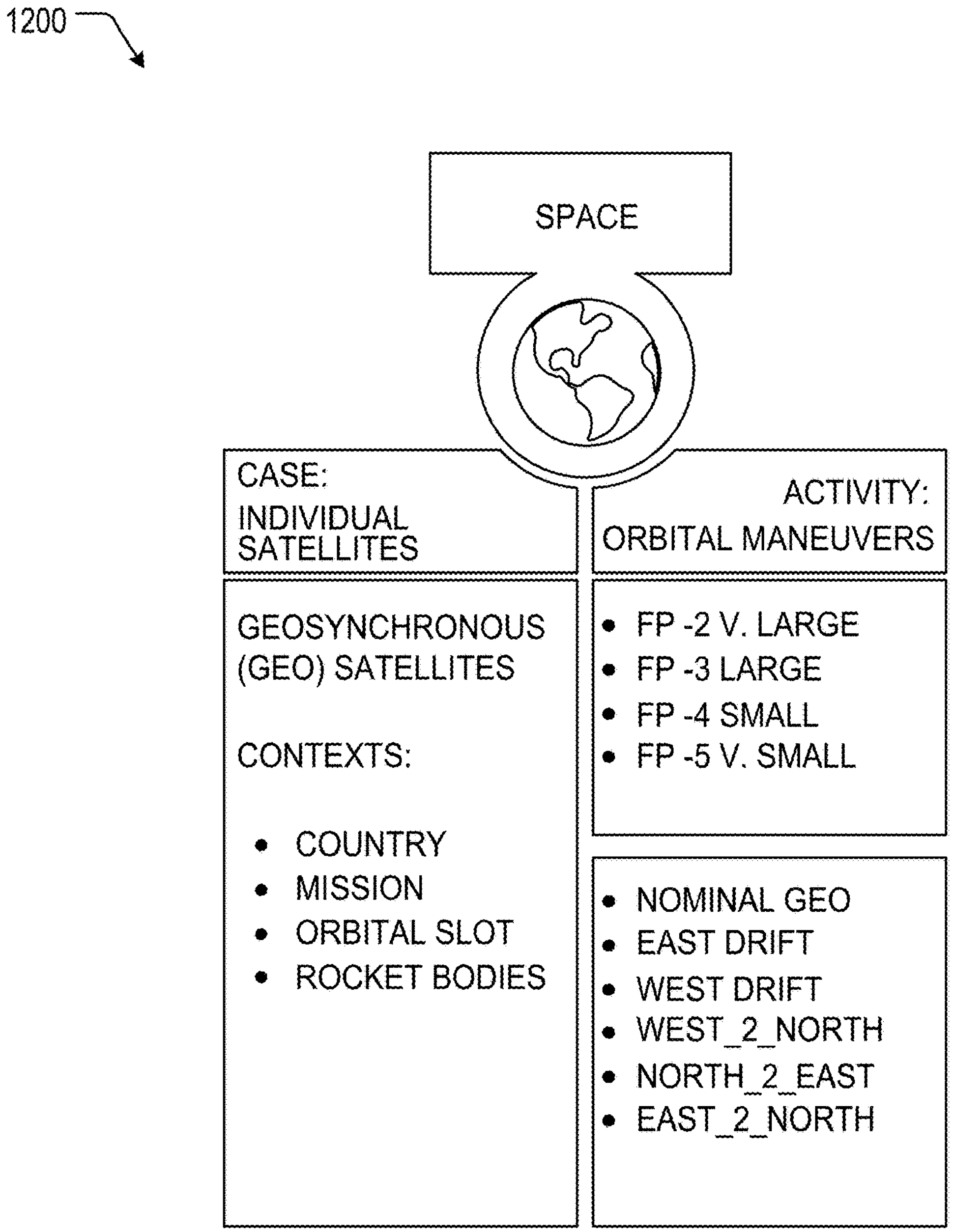
FIG. 12 illustrates another example case according to some implementations.

FIG. 12 illustrates another example case 1200 according to some implementation. In the current example, the case data is associated with satellites in orbit around the Earth and the set of activities includes different types of orbital maneuvers that may be performed by a satellite. In this example, there are two different orbital maneuvers ontonogies depicted (e.g., four maneuvers and six maneuvers) that may be performed by a satellite. In various examples, each event log may be formed for each activity performed by each satellite.

Figure 13:
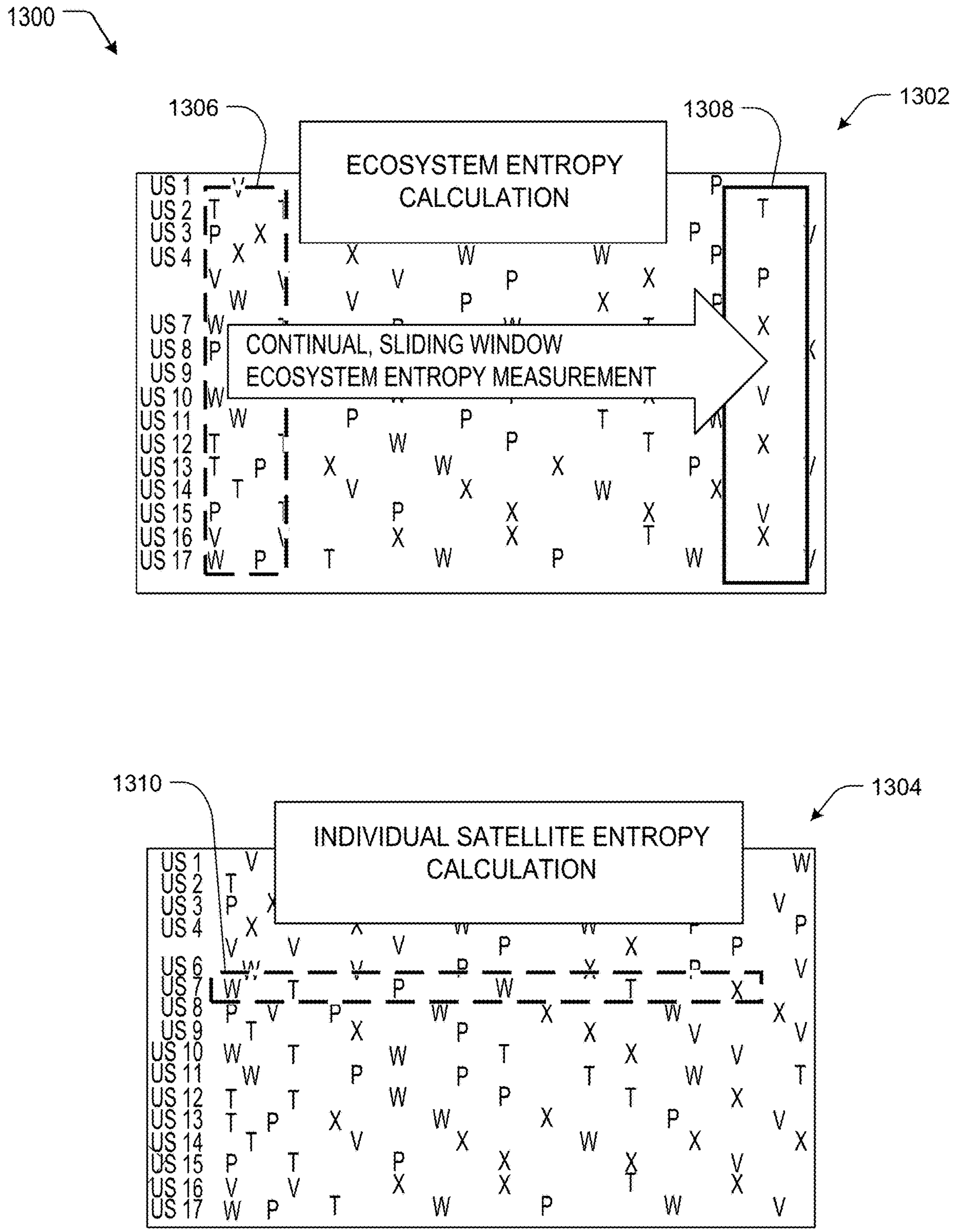
FIG. 13 illustrates a pictorial diagram including example graphs showing entropy calculation for a set of actors and for individual actors according to some implementations.

FIG. 13 illustrates a pictorial diagram 1300 including example graphs 1302 and 1304 showing an entropy calculation for an ecosystem and for individual agents according to some implementation. In the current example, the event data is associated with the case 1200 of FIG. 12 and the agents include satellites and the activities are the orbital maneuvers. In the ecosystem graph 1306 the entropy may be calculated for each event within a sliding window, generally indicated by sliding windows 1306 and 1308, of periods of time regardless of the agent (e.g., satellite) performing the action (e.g., maneuver). In the individual graph 1308, the entropy may be determined for the period of time but for a single agent, as indicated by 1310.

Figure 14:
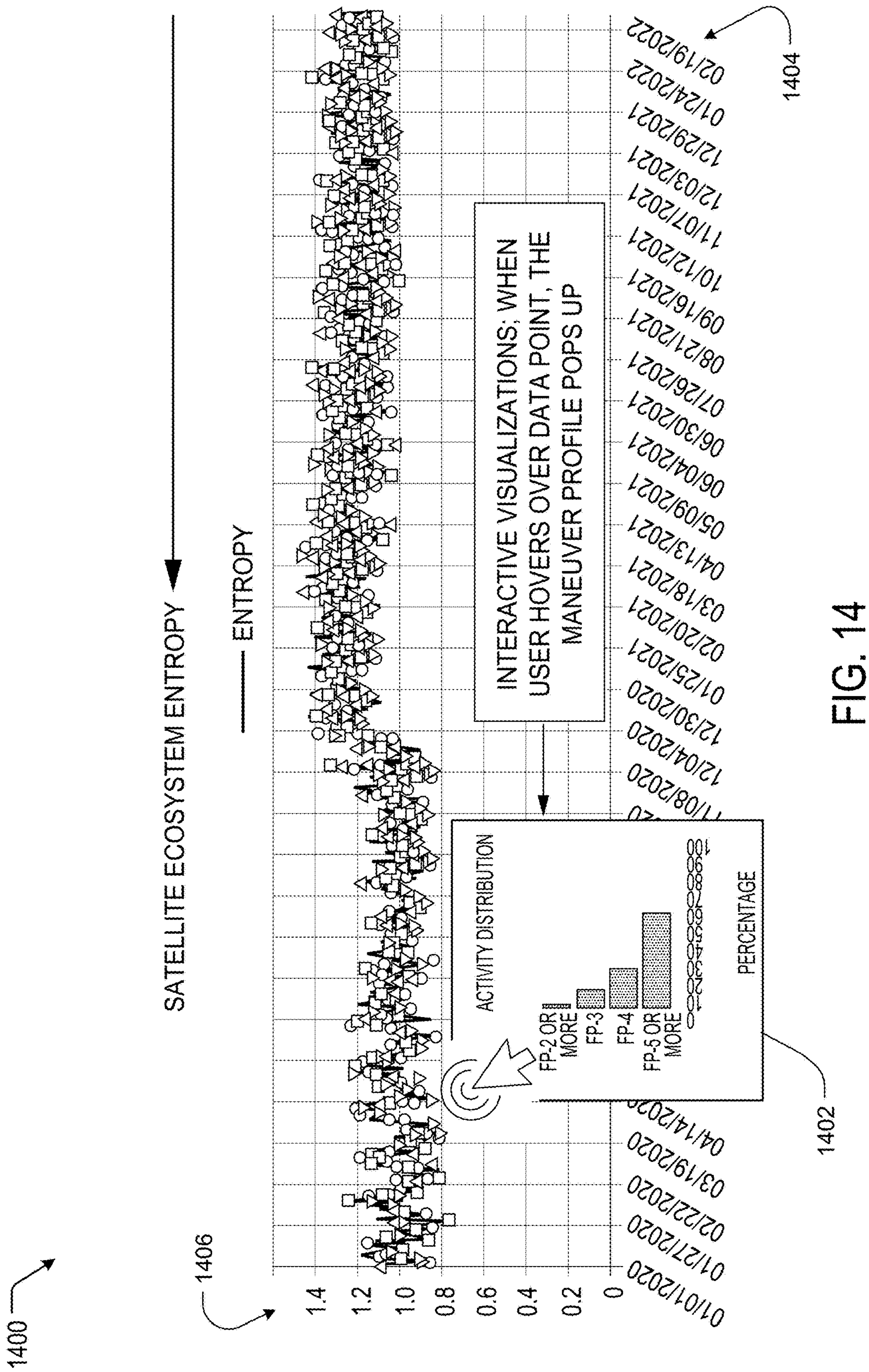
FIG. 14 illustrates a pictorial diagram of a time series visual representation of an ecosystem including context windows according to some implementations.

FIG. 14 illustrates a pictorial diagram of a time series visual representation 1400 of an ecosystem including context windows, such as context window 1402, according to some implementation. In the current example, the visual representation 1400 includes an x-axis 1404 representing dates and a y-axis 1406 reprinting entropy values. The user is interacting with a position along the plotted time series and in response the entropy analysis platform is causing a display of the context window 1402 to provide additional entropy data related to the corresponding time series position.

Figure 15:
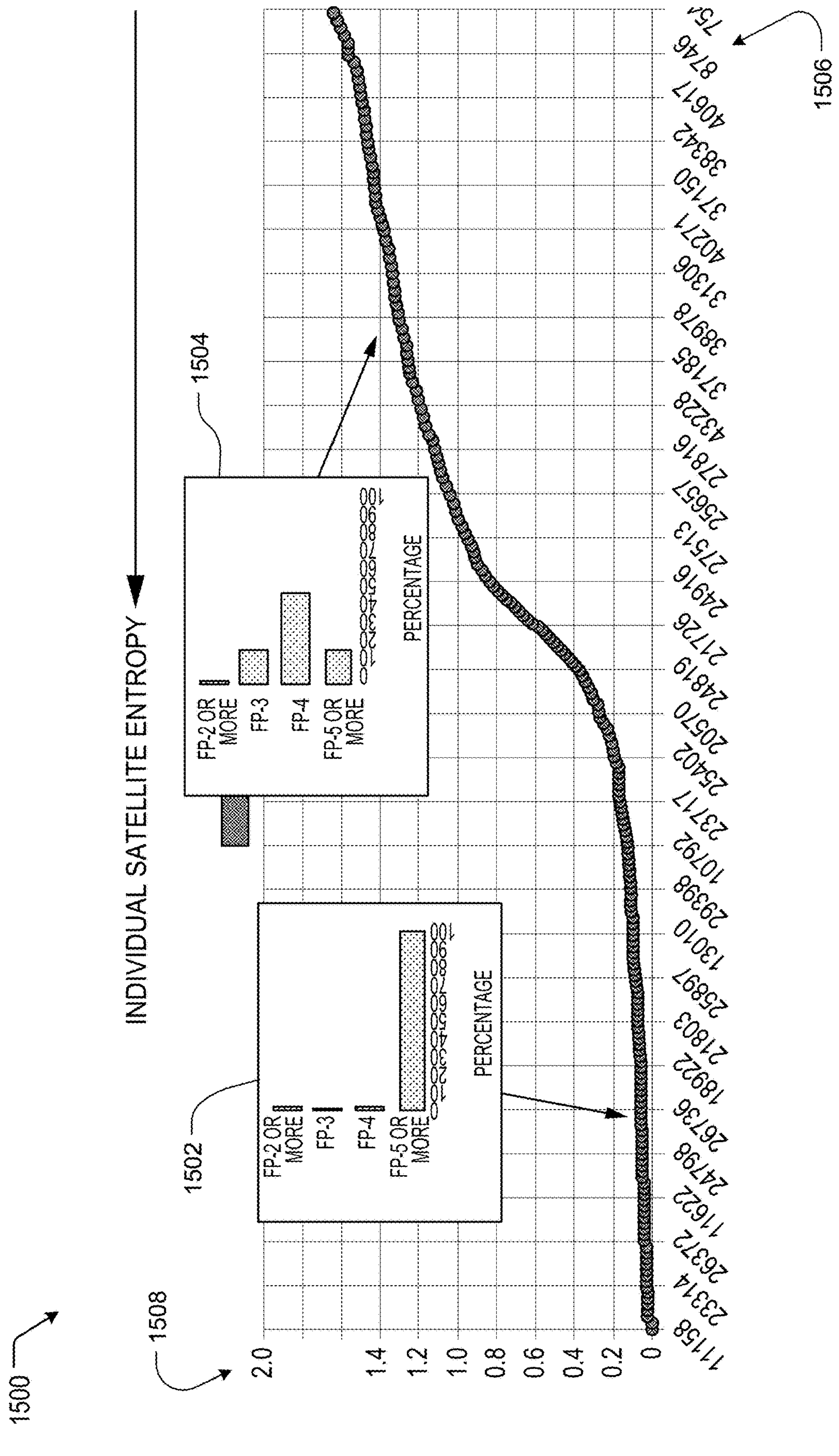
FIG. 15 illustrates a pictorial diagram of a time series visual representation of an individual agent including context windows according to some implementations.

FIG. 15 illustrates a pictorial diagram of a time series visual representation 1500 of an individual agent including context windows, such as context windows 1502 and 1504, according to some implementation. In the current example, the user may have selected two positions along the plotted time series and in response the entropy analysis platform is causing display of the context window 1502 and 1504 to provide additional entropy data related to the corresponding time series position, such as to allow the user to compare the additional entropy data for each position. In the current example, two context windows are displayed, however, it should be understood that any number of context windows may be concurrently displayed to a user via a display device.

Figure 16:
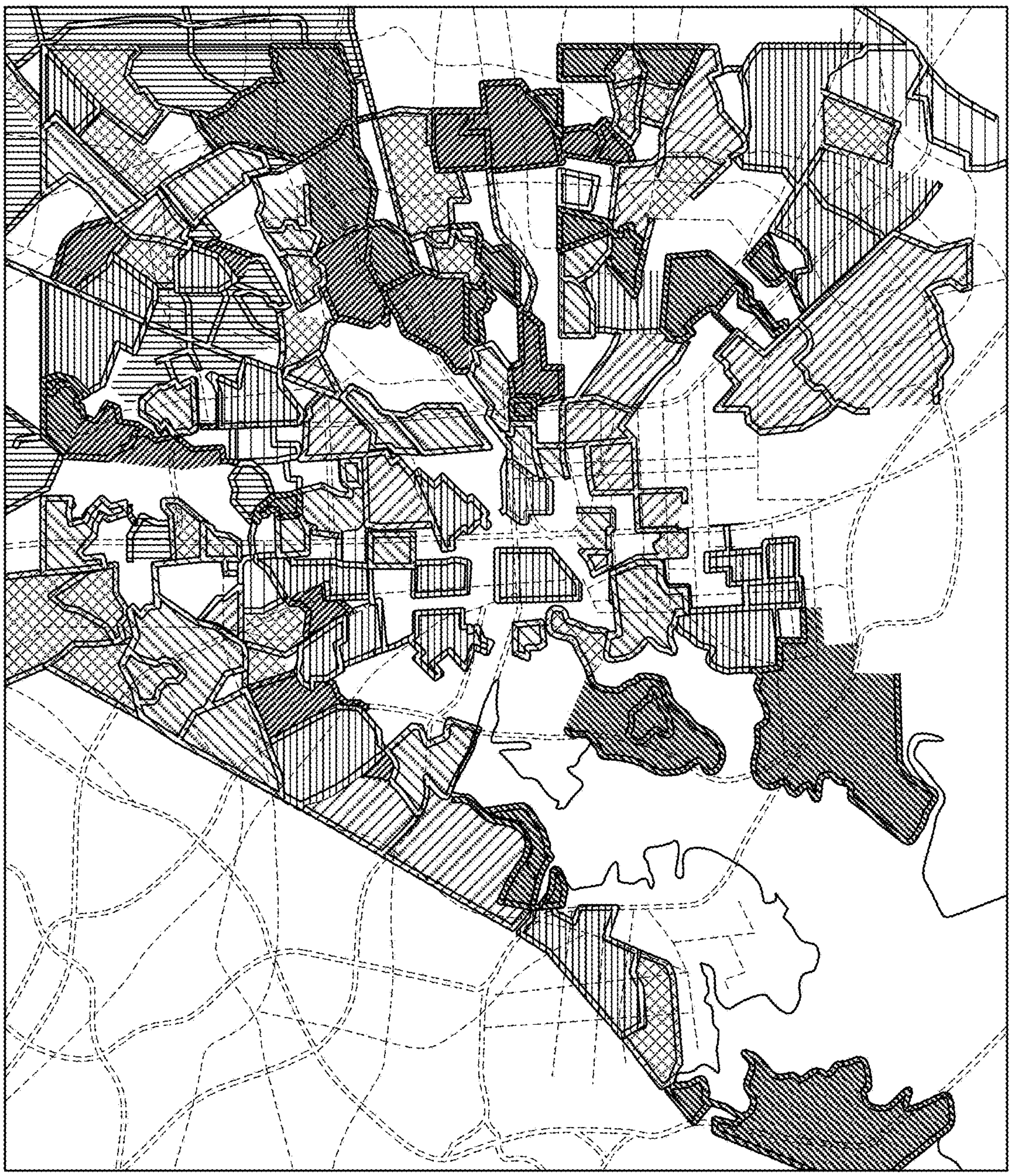
FIG. 16 illustrates a pictorial diagram of a geospatial representation of entropy data according to some implementations.

FIG. 16 illustrates a pictorial diagram of a geospatial representation 1600 of entropy data according to some implementation. In the current example, the entropy data may be regionalized, such as for each neighborhood of a city or the like. The entropy analysis platform may then assign entropy values to each region, determining a maximum and minimum entropy value. The system may then apply a visual indication, such as the cross hatching in the current example, to represent different degrees, percentages, ranges, or the like of entropy between different regions. In other examples, the geospatial representation 1600 may utilize color, gray-scale, density of dots or other icons, and the like to indicate amounts of entropy per region.

FIG. 17 illustrates a pictorial diagram 1700 of a time series visual representation 1702 and 1704 and geospatial visual representation 1706 of entropy data according to some implementation. For example, the geospatial visual representation 1706 may be the representation 1600 of FIG. 16, the time series visual representation 1704 may be for an ecosystem as in representation 1400 of FIG. 14 or for an individual agent as in representation 1500 of FIG. 15. In the current example, the time series visual representation 1702 may be a trend or other additional representation that may allow for additional information when consumed by a user. The pictorial diagram 1700 may also include a text based window 1708 that may provide additional context associated with a case, event, analysis, or the like.

Figure 18:
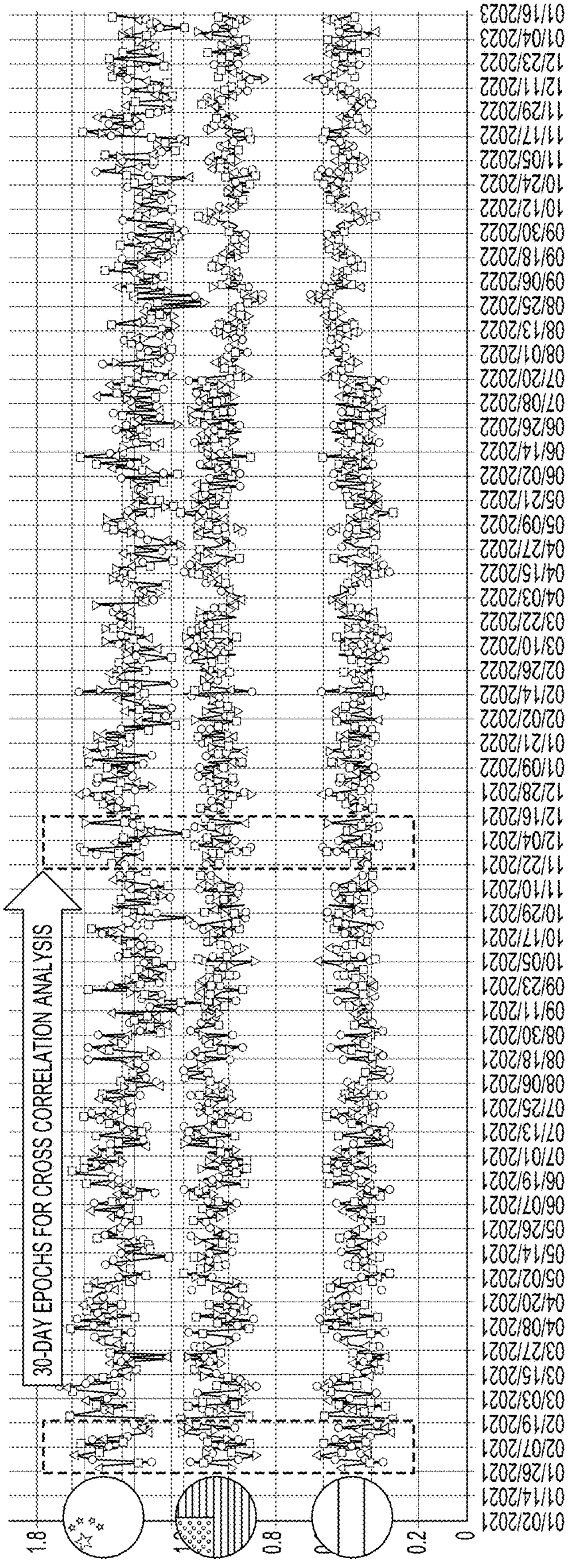
FIG. 18 illustrates a pictorial diagram of a time series visual comparative representation of entropy data according to some implementations.

FIG. 18 illustrates a pictorial diagram of a time series visual comparative representation 1800 of entropy data according to some implementation. The time series visual comparative representation 1800 may allow for multiple time series graphs that may each represent a set of agents or events to be displayed in a manner that may allow a user to compare the entropy for the sets as illustrated. In some cases, the system may perform analysis over a sliding window, such as the 30 day window shown.

Figure 19:
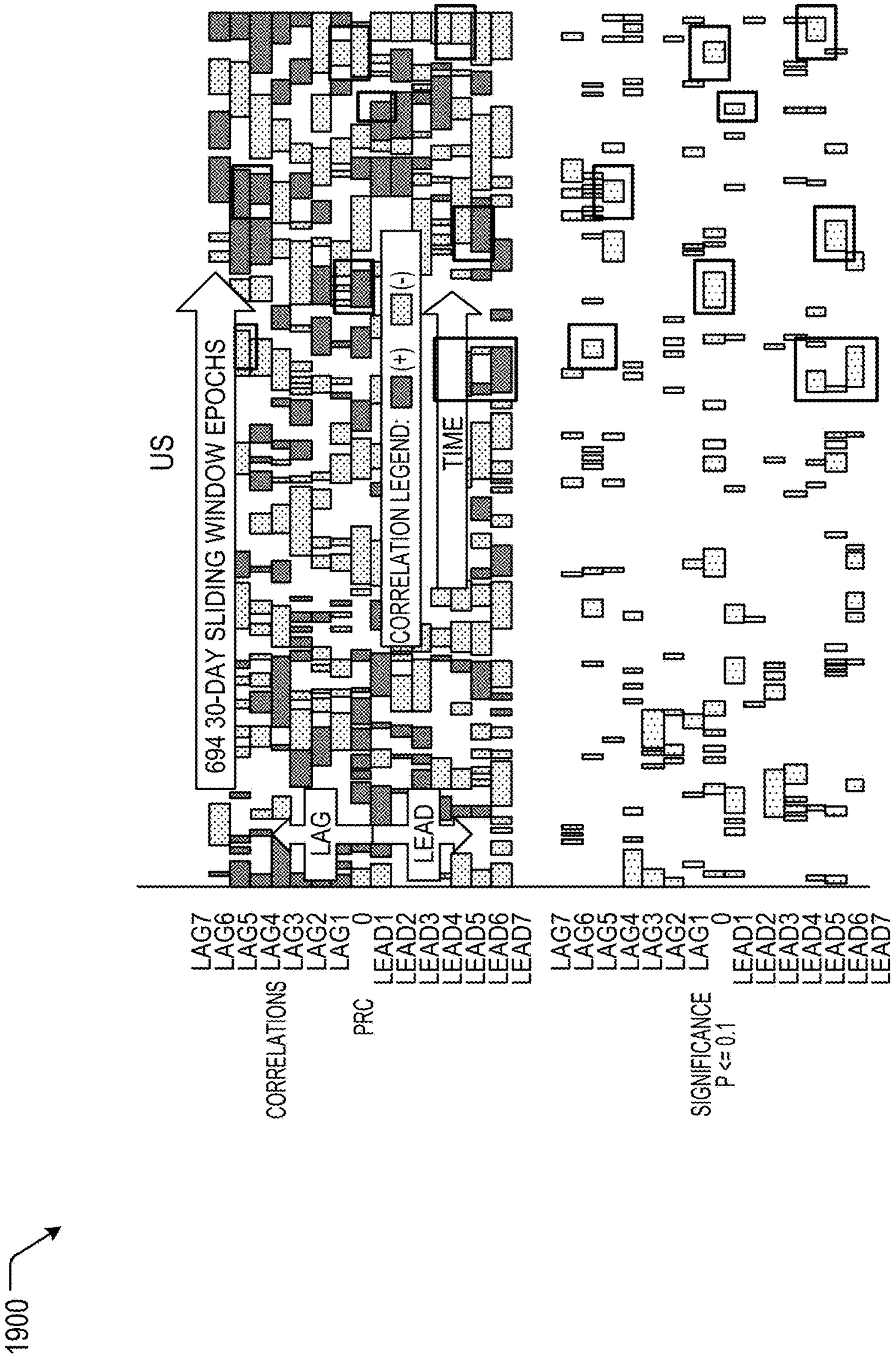
FIG. 19 illustrates a pictorial diagram of an example results of a sliding window analysis of the entropy data of visual comparative representation of FIG. 18 according to some implementations.

FIG. 19 illustrates a pictorial diagram of an example result 1900 of a sliding window analysis of the entropy data of visual comparative representation 1800 of FIG. 18 according to some implementation. In the current example, the results 1900 may include correlations, or the like. The diagram identifies significant positive and negative correlations based on the number lead and lag time periods. For example, two time series are selected from visual comparative representation 1800 of FIG. 18. Additionally, a lead and lag time step is defined. For a daily time series, a day might be selected as the lead and lag time step. For a monthly time series, a month may be chosen as the lead and lag time step. One time series is selected as the base or fixed or comparison time series. The other time series is leaded and lagged relative to the base or fixed time series. Correlation coefficients and p-values are calculated for each leaded and lagged time series against the base or fixed time series.

Figure 20:
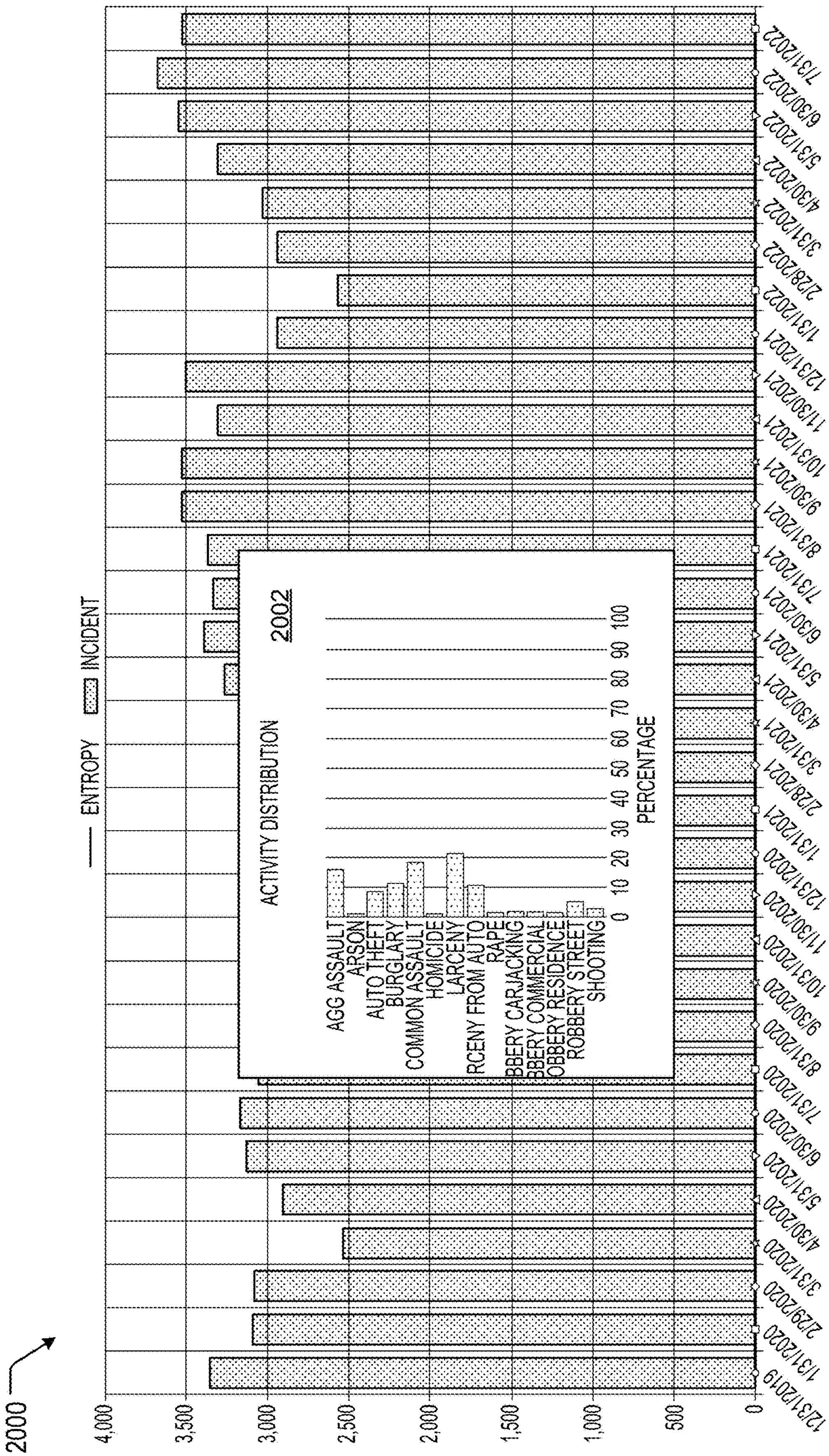
FIG. 20 illustrates a pictorial diagram of a visual representation of entropy data according to some implementations.

FIG. 20 illustrates a pictorial diagram of a visual representation 2000 of entropy data according to some implementation. In the current example, the entropy data is represented in a bar graph format and the user has interacted with the bar graph to cause the system to display context window 2002.

Figure 21:
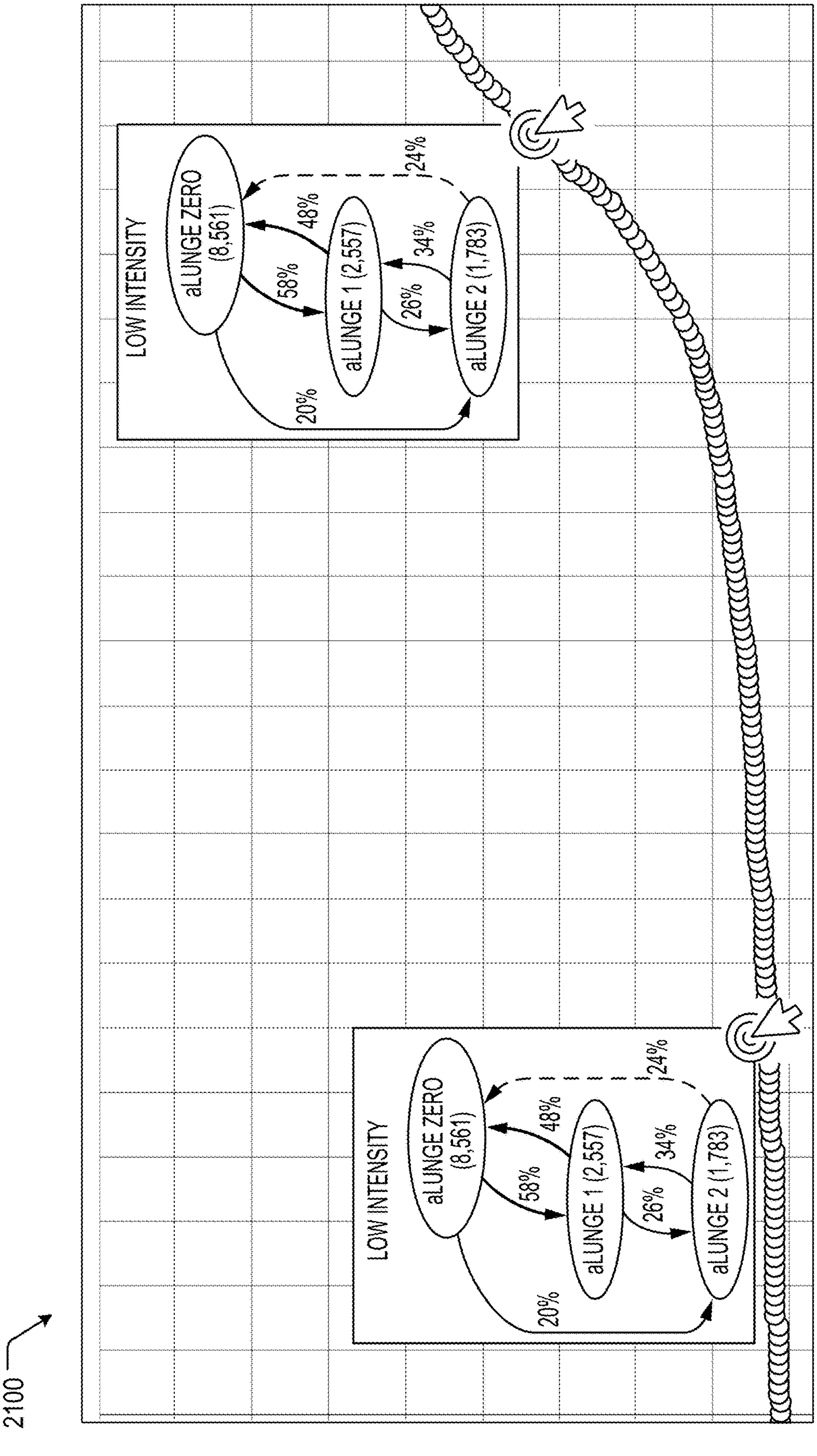
FIG. 21 illustrates a pictorial diagram of a visual representation of entropy data according to some implementations.

FIG. 21 illustrates a pictorial diagram of a visual representation 2100 of entropy data according to some implementation. In the current example, the entropy data is represented in an information flow or process model format and the user has interacted with the line chart or bar graph to cause the system to display context window 2102 and 2104. In this example, the entropy analysis platform may accept or receive event data and generate Markov transition probabilities for activities in event data, such as by counting events for the activities as well as activity transitions or sojourns. In some cases, the entropy analysis platform may determine Markov transition probabilities by observing activity transitions or sojourns in the event data via a Markov transition matrix, calculate a plurality of descriptive statistics (in both linear and log scale) such as mean, median, skew, and kurtosis, and use heuristics to connect the different states in the visual representation 2100.

The entropy analysis platform may output the visual representation 2100 of depicting activities of the process or system and the interconnection of such activities as identified in the event data, and descriptive statistics for each activity determined from measurements derived from the event logs. For example, the entropy analysis platform may identify activities in the event data and loop over all the activities. Next, the entropy analysis platform may count events for each activity. That is, the entropy analysis platform may count the number of times each activity occurs. The entropy analysis platform may also count a number of activity transitions or sojourns. That is, the entropy analysis platform counts the number of times the inner loop activities transition to outer loop activities. Next, the entropy analysis platform computes Markov transition probabilities, for example, by dividing the number of activity transitions or sojourns by the number of events for the activity. The entropy analysis platform may populate a Markov matrix with statistics for each transition activity, including the possibility for an activity to repeat itself.

Although the subject matter has been described in language specific to structural features, it is to be understood that the subject matter defined in the appended claims is not necessarily limited to the specific features described. Rather, the specific features are disclosed as illustrative forms of implementing the claims.

EXAMPLE CLAUSES

A. A method comprising: receiving a plurality of event logs associated with a set of agents for a period of time; assigning each event log to one of a plurality of regions based at least in part on a feature associated with an activity of the event log of the plurality of event logs; determining, based at least in part on the plurality of event logs and the plurality of regions, entropy data for each region of the plurality of regions; determining, for the period of time and based at least in part on the entropy data, a maximum entropy value; generating, based at least in part on the maximum entropy value and the plurality of regions, a visual representation of the entropy data for the period of time; generating, based at least in part on the maximum entropy value and entropy data for a region of the plurality of regions, a context window of the entropy data for the region during the period of time; causing the visual representation to be presented on a display of a user device; and responsive to a user interaction with the region, causing the context window to be displayed concurrently with the visual representation on the display of the user device.

B. The method of A, wherein each event log represents an initialization through completion of a corresponding activity from a plurality of predefined activities for an agent of the set of agents.

C. The method of A, wherein the plurality of regions are associated with a physical environment.

D. The method of A, wherein generating the visual representation further comprises determining, based at least in part on maximum entropy value, a set of visual indications; and assigning, based at least in part on the entropy data for each region of the plurality of regions, at least one of the set of visual indications to each region of the plurality of regions.

E. The method of D, wherein determining the set of visual indications further comprises determining at least a first range and a second range based at least in part on the maximum entropy value, the first range different than the second range; assign each of the plurality of regions to one of the first range and the second range; and assigning a first visual representation to the first range and a second visual representations to the second range.

F. The method of A, wherein the period of time is a first period of time and the method further comprises determining, based at least in part the entropy data for the region during the first period of time and second entropy data associated with the region during a second period of time prior to the first period of time, a difference; and responsive to the difference being greater than or equal to a threshold, causing an alert to be presented on the display of the user device, the alert associated with the region.

G. The method of A, further comprising determining, based at least in part on the plurality of event logs, a time series visual representation associated with the set of agents; and causing the time series visual representation to be displayed on the user device.

H. The method of A, further comprising determining, based at least in part on the entropy data associated with a first agent of the set of agents, a time series visual representation associated with the first agent; and causing the time series visual representation to be displayed on the user device.

I. The method of A, further comprising determining, based at least in part on the plurality of event logs, a first time series visual representation associated with the set of agents; determining, based at least in part on the entropy data associated with a first agent of the set of agents, a second time series visual representation associated with the first agent; and causing the first time series visual representation and the second time series visual representation to be concurrently displayed on the user device.

J. A system comprising: a display; a user interface; one or more processors; and one or more non-transitory computer readable media storing instructions executable by the one or more processors, wherein the instructions, when executed, cause the one or more processors to perform operations comprising: receiving a first visual representation of entropy data associated with a period of time, the visual representation including at least two regions; causing the first visual representation to be presented on the display; receiving a user interaction, at least partially via the user interface, with a first region of the at least two regions; and causing, in response to the user interaction, a context window to be presented on the display concurrently with the visual representation, the context window including entropy data associated with the first region during the period of time.

K. The system of J, wherein: the at least two regions includes a second region different than the first region; the first region includes a first visual indicator of entropy activity within the first region; and the second region includes a second visual indicator of entropy activity within the second region, the second visual indicator different than the first visual indicator.

L. The system of K, further comprising: assigning the first visual indicator to a first entropy range and the second visual indicator to a second entropy range, the first entropy range and the second entropy range determined based at least in part on a maximum entropy value for the period of time; responsive to determining a first entropy value associated with the first region is within the first entropy range, assigning the first visual indicator to the first region; and responsive to determining a second entropy value associated with the second region is within the second entropy range, assigning the second visual indicator to the second region.

M. The system of J, wherein the operations further comprise:

receiving a second user interaction, at least partially via the user interface, with a second region of the at least two regions; and causing in response to the second user interaction, a second context window to be presented on the display concurrently with the visual representation, the second context window including entropy data associated with the second region during the period of time.

N. The system of J, wherein the operations further comprise: receiving time series visual representation of associated with the entropy data; and causing the time series visual representation to be presented on the display.

O. The system of N, wherein the time series visual representation is associated with a single actor of the entropy data.

P. The system of N, wherein the time series visual representation is associated with a sliding window of time less than the period of time.

Q. One or more non-transitory computer readable media storing instructions executable by one or more processors, wherein the instructions, when executed, cause the one or more processors to perform operations comprising: determining, based at least in part on a plurality of event logs, entropy data for each of a plurality of groupings; determining, based at least in part on the plurality of event logs, a maximum entropy value; generating, based at least in part on the entropy data and the maximum entropy value, a first visual representation associated with the plurality of event logs; and causing the first visual representation to be presented on a display of a user device.

R. The one or more non-transitory computer readable media of Q storing additional instructions, which when executed, cause the one or more processors to perform operations comprising: receiving a user interaction associated with a group of first visual representation; and causing in response to the user interaction, a context window to be presented on the display of the user device concurrently with the visual representation, the context window including entropy data associated with the group.

S. The one or more non-transitory computer readable media of Q storing additional instructions, which when executed, cause the one or more processors to perform operations comprising: determining a change in entropy data associated with a group of the plurality of groupings with respect to prior entropy data associated with the group; and responsive to the change being greater than or equal to a threshold, causing an alert to be presented on the display of the user device.

T. The one or more non-transitory computer readable media of Q storing additional instructions, which when executed, cause the one or more processors to perform operations comprising: determining a time series visual representation of associated with the plurality of event logs; and causing the time series visual representation to be presented on the display on the user device concurrently with the first visual representation.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:

receiving a plurality of event logs associated with a set of agents for a period of time;

assigning each event log to one of a plurality of regions based at least in part on a feature associated with an activity of the event log of the plurality of event logs;

determining, based at least in part on the plurality of event logs and the plurality of regions, entropy data for each region of the plurality of regions;

determining, for the period of time and based at least in part on the entropy data, a maximum entropy value;

generating, based at least in part on the maximum entropy value and the plurality of regions, a visual representation of the entropy data for the period of time;

generating, based at least in part on the maximum entropy value and entropy data for a region of the plurality of regions, a context window of the entropy data for the region during the period of time;

causing the visual representation to be presented on a display of a user device; and responsive to a user interaction with the region, causing the context window to be displayed concurrently with the visual representation on the display of the user device.

2. The method of claim 1, wherein each event log represents an initialization through completion of a corresponding activity from a plurality of predefined activities for an agent of the set of agents.

3. The method of claim 1, wherein the plurality of regions are associated with a physical environment.

4. The method of claim 1, wherein generating the visual representation further comprises:

determining, based at least in part on maximum entropy value, a set of visual indications; and assigning, based at least in part on the entropy data for each region of the plurality of regions, at least one of the set of visual indications to each region of the plurality of regions.

5. The method of claim 4, wherein determining the set of visual indications further comprises:

determining at least a first range and a second range based at least in part on the maximum entropy value, the first range different than the second range;

assign each of the plurality of regions to one of the first range and the second range; and assigning a first visual representation to the first range and a second visual representations to the second range.

6. The method of claim 1, wherein the period of time is a first period of time and the method further comprises:

determining, based at least in part the entropy data for the region during the first period of time and second entropy data associated with the region during a second period of time prior to the first period of time, a difference; and responsive to the difference being greater than or equal to a threshold, causing an alert to be presented on the display of the user device, the alert associated with the region.

7. The method of claim 1, further comprising:

determining, based at least in part on the plurality of event logs, a time series visual representation associated with the set of agents; and causing the time series visual representation to be displayed on the user device.

8. The method of claim 1, further comprising:

determining, based at least in part on the entropy data associated with a first agent of the set of agents, a time series visual representation associated with the first agent; and causing the time series visual representation to be displayed on the user device.

9. The method of claim 1, further comprising:

determining, based at least in part on the plurality of event logs, a first time series visual representation associated with the set of agents;

determining, based at least in part on the entropy data associated with a first agent of the set of agents, a second time series visual representation associated with the first agent; and causing the first time series visual representation and the second time series visual representation to be concurrently displayed on the user device.

10. A system comprising:

a display;

a user interface;

one or more processors; and one or more non-transitory computer readable media storing instructions executable by the one or more processors, wherein the instructions, when executed, cause the one or more processors to perform operations comprising:

receiving a first visual representation of entropy data associated with a period of time, the visual representation including at least two regions;

causing the first visual representation to be presented on the display;

receiving a user interaction, at least partially via the user interface, with a first region of the at least two regions; and causing, in response to the user interaction, a context window to be presented on the display concurrently with the visual representation, the context window including entropy data associated with the first region during the period of time.

11. The system of claim 10, wherein:

the at least two regions includes a second region different than the first region;

the first region includes a first visual indicator of entropy activity within the first region; and the second region includes a second visual indicator of entropy activity within the second region, the second visual indicator different than the first visual indicator.

12. The system of claim 11, further comprising:

assigning the first visual indicator to a first entropy range and the second visual indicator to a second entropy range, the first entropy range and the second entropy range determined based at least in part on a maximum entropy value for the period of time;

responsive to determining a first entropy value associated with the first region is within the first entropy range, assigning the first visual indicator to the first region; and responsive to determining a second entropy value associated with the second region is within the second entropy range, assigning the second visual indicator to the second region.

13. The system of claim 10, wherein the operations further comprise:

receiving a second user interaction, at least partially via the user interface, with a second region of the at least two regions; and causing in response to the second user interaction, a second context window to be presented on the display concurrently with the visual representation, the second context window including entropy data associated with the second region during the period of time.

14. The system of claim 10, wherein the operations further comprise:

receiving time series visual representation of associated with the entropy data; and causing the time series visual representation to be presented on the display.

15. The system of claim 14, wherein the time series visual representation is associated with a single actor of the entropy data.

16. The system of claim 14, wherein the time series visual representation is associated with a sliding window of time less than the period of time.

17. One or more non-transitory computer readable media storing instructions executable by one or more processors, wherein the instructions, when executed, cause the one or more processors to perform operations comprising:

determining, based at least in part on a plurality of event logs, entropy data for each of a plurality of groupings;

determining, based at least in part on the plurality of event logs, a maximum entropy value;

generating, based at least in part on the entropy data and the maximum entropy value, a first visual representation associated with the plurality of event logs; and causing the first visual representation to be presented on a display of a user device.

18. The one or more non-transitory computer readable media of claim 17 storing additional instructions, which when executed, cause the one or more processors to perform operations comprising:

receiving a user interaction associated with a group of first visual representation; and causing in response to the user interaction, a context window to be presented on the display of the user device concurrently with the visual representation, the context window including entropy data associated with the group.

19. The one or more non-transitory computer readable media of claim 17 storing additional instructions, which when executed, cause the one or more processors to perform operations comprising:

determining a change in entropy data associated with a group of the plurality of groupings with respect to prior entropy data associated with the group; and responsive to the change being greater than or equal to a threshold, causing an alert to be presented on the display of the user device.

20. The one or more non-transitory computer readable media of claim 17 storing additional instructions, which when executed, cause the one or more processors to perform operations comprising:

determining a time series visual representation of associated with the plurality of event logs; and causing the time series visual representation to be presented on the display on the user device concurrently with the first visual representation.

* * * * *